(12) United States Patent
Sasada

(10) Patent No.: US 7,569,261 B2
(45) Date of Patent: Aug. 4, 2009

(54) CELLULOSE ACYLATE FILM AND METHOD FOR PRODUCING SAME, AND RETARDATION FILM, POLARIZING PLATE AND LIQUID CRYSTAL DISPLAY DEVICE COMPRISING THE FILM

(75) Inventor: Yasuyuki Sasada, Minami-ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 0 days.

(21) Appl. No.: 11/798,848

(22) Filed: May 17, 2007

(65) Prior Publication Data

US 2007/0269617 A1 Nov. 22, 2007

(30) Foreign Application Priority Data

May 18, 2006 (JP) ............................. 2006-139565

(51) Int. Cl.
*C08B 3/16* (2006.01)
(52) U.S. Cl. ........................ 428/1.54; 536/58; 264/2.6
(58) Field of Classification Search ............... 428/1.33, 428/1.54; 106/139.1; 264/1.34, 2.6, 197, 264/200, 346; 536/58, 85
See application file for complete search history.

(56) References Cited

U.S. PATENT DOCUMENTS

| | | | |
|---|---|---|---|
| 3,498,741 A * | 3/1970 | Riley | 8/131 |
| 3,608,059 A * | 9/1971 | Dotson et al. | 264/345 |
| 5,977,347 A * | 11/1999 | Shuto et al. | 536/64 |
| 2002/0162483 A1 * | 11/2002 | Shimizu et al. | 106/170.28 |
| 2004/0247918 A1 * | 12/2004 | Hashimoto | 428/532 |
| 2007/0275187 A1 | 11/2007 | Sasada | |
| 2007/0275188 A1 | 11/2007 | Sasada | |

FOREIGN PATENT DOCUMENTS

| | | |
|---|---|---|
| JP | 5-157911 A | 6/1993 |
| JP | 2000-231016 A | 8/2000 |
| JP | 2002-127244 A | 5/2002 |
| JP | 2003-014933 A | 1/2003 |
| JP | 2004-243628 A | 9/2004 |
| JP | 2005-22087 A | 1/2005 |
| JP | 2005-330411 A | 12/2005 |
| JP | 2006-030937 A | 2/2006 |
| JP | WO2006030954 A1 * | 3/2006 |

* cited by examiner

*Primary Examiner*—Keith D Hendricks
*Assistant Examiner*—Sophie Hon
(74) *Attorney, Agent, or Firm*—Buchanan Ingersoll & Rooney PC

(57) ABSTRACT

A Cellulose acylate film, in which X-ray diffraction intensity satisfies following formulae and a half-value width of the peak at $2\theta_2$ is greater than 3° and not greater than 7°:

$$0.40 \leq Ic_2/(Iam_2+Ic_2) \leq 0.75;$$

$$Iam_2I_1+\{(I_3-I_1)/(2\theta_3-2\theta_1)\times(2\theta_2-2\theta_1)\}; \text{ and}$$

$$Ic_2=I_2-Iam_2,$$

wherein when it is assumed that $\theta$ is the Bragg angle, $2\theta_1$ and $2\theta_3$ indicate $2\theta$ at which the intensity becomes the minimum in the $2\theta$ range of 4° to 5° and 14° to 16°, respectively, $2\theta_2$ indicates $2\theta$ at which the intensity becomes the maximum in the $2\theta$ range of 5° to 10°, and $I_1$, $I_2$ and $I_3$ indicate a diffractive intensity at $2\theta_1$, $2\theta_2$ and $2\theta_3$, respectively.

7 Claims, 1 Drawing Sheet

CELLULOSE ACYLATE FILM AND METHOD FOR PRODUCING SAME, AND RETARDATION FILM, POLARIZING PLATE AND LIQUID CRYSTAL DISPLAY DEVICE COMPRISING THE FILM

BACKGROUND OF THE INVENTION

1. Field of the invention

The present invention relates to a cellulose acylate film having small optical anisotropy and capable of being directly stuck to a polarizing film, and a method for producing thereof, and to a retardation film, a polarizer, and a liquid crystal device using the cellulose acylate film.

2. Description of the Related Art

A polymer film of typically cellulose ester, polyester, polycarbonate, cyclo-olefin polymer, vinyl polymer or polyimide is used in silver halide photographic materials, retardation films, polarizers and image display devices. Films that are more excellent in point of the surface smoothness and the uniformity can be produced from these polymers, and the polymers are therefore widely-employed for optical films.

Of those, cellulose ester films having suitable moisture permeability can be directly stuck to most popular polarizing films formed of polyvinyl alcohol (PVA)/iodine in on-line operation. Accordingly, cellulose acylate, especially cellulose acetate is widely employed as a protective film for polarizers.

When the cellulose acylate film is utilized in optical application such as a retardation film, a protecting film for a supporter of the retardation film and for a polarizing plate, and a liquid crystal display device, the control of the optical anisotropy is a very important point in determination of the display device performance (for example, visibility). Recently, it is required to improve retardation compensation as a wide visual field angle is required in the liquid crystal display device. Accordingly, it is required to appropriately control a value of retardation in an in-plane direction (Re; hereinafter, may be referred to as "Re" briefly) and a value of retardation in a thickness direction (Rth; hereinafter, may be referred to as "Rth" briefly) of the retardation film disposed between a polarization film and a liquid crystal cell. In addition, since the protecting film, which is the film protecting the polarizing plate and is disposed between the polarizing film and the liquid crystal cell, is required to have optical isotropy, that is, to be low in Re and Rth, it has a great effect on the visibility of the liquid crystal display device. Moreover, it is required to appropriately control the moisture absorptivity as well as the optical characteristic on the film.

As a method of producing the cellulose acylate film showing the optical characteristic, there is disclosed, for example, a method using a retardation-lowering agent or a method selecting kinds of polymers (for example, see JP-A-2006-30937). However, in the film produced by these methods, both of the optical property and the moisture absorptivity can not be compatible with each other.

In addition, there is disclosed a method of producing a retardation film by extending a web of cellulose ester dope at a temperature in the range of 140° C. to 200° C. (for example, see JP-A-2003-14933). However, kinds of polymers and a heating temperature are not appropriately controlled in the documents, thus the film in which the retardation is low can not be obtained.

SUMMARY OF THE INVENTION

An object of the invention is to provide a cellulous acylate film in which both of the optical property and the moisture absorptivity are improved and a method of manufacturing the same. In addition, another object of the invention is to provide a cellulous acylate film and a method of manufacturing the same which have smaller retardation. Further, another object of the invention is to provide a retardation film using the cellulous acylate film according to the invention and a polarizing plate having an excellent optical property by directly adhering the cellulous acylate film according to the invention, which serves as a retardation film, a supporter of the retardation film, or a protective film of the polarizing plate, to a polarizing film. Further, the other object of the invention is to provide a liquid crystal display device having high reliability.

The above-mentioned problem can be solved by the following means.

(1) A Cellulose acylate film, wherein the X-ray diffraction intensity satisfies Formulae (I) to (III) and the half-value width at $2\theta_2$ is greater than 3° and not greater than 7°:

$$0.40 \leq Ic_2/(Iam_2+Ic_2) \leq 0.75; \quad \text{Formula (I):}$$

$$Iam_2 = I_1 + \{(I_3-I_1)/(2\theta_3-2\theta_1) \times (2\theta_2-2\theta_1)\}; \quad \text{Formula (II):}$$

and $$Ic_2 = I_2 - Iam_2, \quad \text{Formula (III):}$$

wherein when it is assumed that $\theta$ is the Bragg angle, $2\theta_1$ indicates $2\theta$ at which the intensity becomes the minimum in the $2\theta$ range of 4° to 5°, $2\theta_2$ indicates $2\theta$ at which the intensity becomes the maximum in the $2\theta$ range of 5° to 10°, $2\theta_3$ indicates $2\theta$ at which the intensity becomes the minimum in the $2\theta$ range of 14° to 16°, $I_1$ indicates a diffractive intensity at $2\theta_1$, $I_2$ indicates a diffractive intensity at $2\theta_2$, and $I_3$ indicates a diffractive intensity at $2\theta_3$.

(1-2) The cellulose acylate film according to claim 1, in which the X-ray diffraction intensity satisfies following Formulae (IV) to (VI):

$$Ic_4/(Iam_4+Ic_4) \leq 0.20; \quad \text{Formula (IV):}$$

$$Iam_4 = I_1 + \{(I_3-I_1)/(2\theta_3-2\theta_1) \times (2\theta_4-2\theta_1)\}; \quad \text{Formula (V):}$$

and $$Ic_4 = I_4 - Iam_4, \quad \text{Formula (VI):}$$

wherein when it is assumed that $\theta$ is the Bragg angle, $2\theta_1$ indicates $2\theta$ at which the intensity becomes the minimum in the $2\theta$ range of 4° to 5°, $2\theta_3$ indicates $2\theta$ at which the intensity becomes the minimum in the $2\theta$ range of 14° to 16°, $2\theta_4$ indicates $2\theta$ at the maximum of a peak in the $2\theta$ range of 12.5° to 14°, $I_1$ indicates a diffractive intensity at $2\theta_1$, $I_3$ indicates a diffractive intensity at $2\theta_3$, and $I_4$ indicates a diffractive intensity at $2\theta_4$.

(1-3) The cellulous acylate film according to (1) or (1-2), wherein the film satisfies the following Formula (VII):

$$Ic_{21}/Ic_{22} > 50. \quad \text{Formula (VII):}$$

[Where when it is assumed that $Ic_{21}$ indicate $Ic_2$ in a direction in which $I_2$ becomes the maximum and $Ic_{22}$ indicate $Ic_2$ in a direction perpendicular thereto.]

(2) The cellulose acylate film according to any one of (1) to (1-3), wherein the moisture absorptivity at a relative humidity of 80% is 3.0% or less.
(3) The cellulous acylate film according to (1) or (2), wherein the haze is 2% or less.
(3-2) The cellulous acylate film according to any one of (1) to (3), which satisfies the Following formula (VIII):

$$Re<5 \text{ and } |Rth|<20 \text{ nm} \quad \text{Formula (VIII):}$$

wherein Re represents an in-plane retardation and Rth represents a retardation in a thickness direction of the film.
(4) A method for producing a cellulose acylate film comprising heating a cellulose acylate film at a temperature not less than $(-285 \times S+970)°$ C. and less than $(-285 \times S+1000)°$ C. for 0.01 minutes to less than 60 minutes wherein S represents a total substitution degree of the cellulose acylate film.
(4-2) The method for producing a cellulose acylate film according to (4), which comprises contracting the cellulose acylate film in a width direction thereof at the time of the heating process.
(5) The method for producing a cellulose acylate film according to (4) or (4-2), wherein the contraction percentage in the process of contracting the cellulose acylate film in the width direction is in the range of 0.1 to 80%.
(5-2) The method for producing a cellulose acylate film according to any one of (4) to (5) wherein a cellulose acylate film containing a remaining solvent in 3.0% by mass or less is supplied into a zone for the heat treatment.
(6) The method for producing a cellulose acylate film according to any one of (4) to (5-2) further comprising extending the cellulose acylate film.
(6-2) The method for producing a cellulose acylate film according to (4) not comprising extending the cellulose acylate film.
(7) A cellulous acylate film manufactured by the method according to any one of (4) to (6-2).
(7-2) A retardation film having at least one sheet of cellulous acylate film according to any one of (1) to (3-2) and (7).
(8) A polarizing plate having at least one sheet of cellulous acylate film according to any one of (1) to (3-2) and (7).
(9) The polarizing plate according to (8), wherein the cellulous acylate film is directly adhered to a polarizing film.
(10) A liquid crystal display device having at least one sheet of the cellulose acylate film according to any one of (1) to (3-2) and (7), the retardation film according to (8), and the polarizing film according to (9).

According to the invention, since the cellulous acylate film which improves both of the optical property and the moisture absorptivity and the method of manufacturing the same are provided, it is possible to provide the excellent retardation film. In addition, it is possible to provide the cellulous acylate film having smaller retardation and the method of manufacturing the same.

Further, since the cellulous acylate film according to the invention has proper moisture permeability, the film may be adhered to the polarizing film on line. Accordingly, the polarizing plate having excellent visibility and high productivity may be provided. In addition, the liquid crystal display device having high reliability may be provided.

BEST MODE FOR CARRYING OUT THE INVENTION

Figure 1:
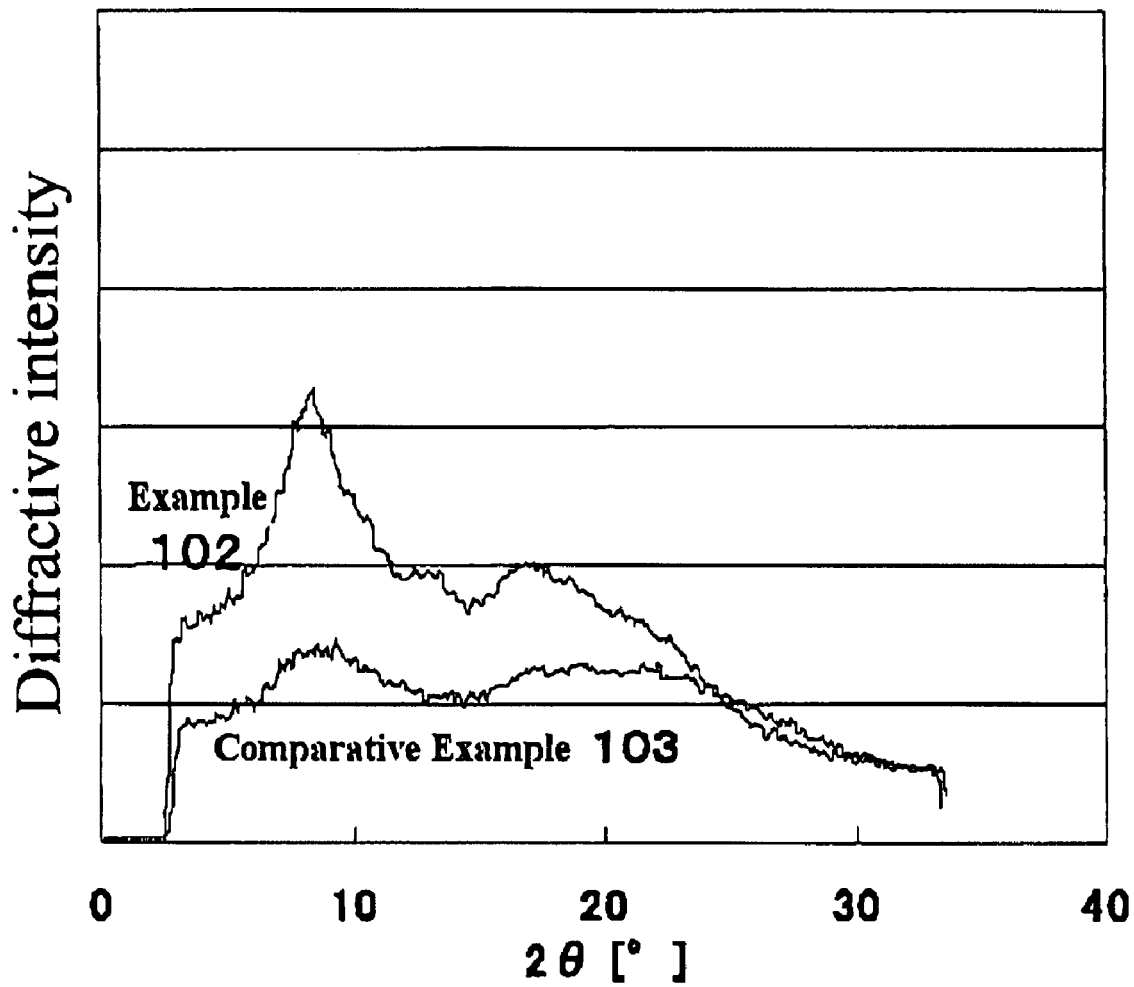
FIG. 1 shows diffraction profile in a direction in which the peak intensity in the $2\theta$ range of 5° to 10° becomes the maximum in Example 102 and Comparative Example 103.

Described in detail hereinafter are the cellulose acylate film and the method for producing it, the retardation film, the polarizer and the liquid crystal display device of the invention. The constituent features may be described below on the basis of representative embodiments of the invention, but the invention is not limited to such embodiments. The numerical range represented by "–" herein means a range including the numerical values described before and after "–" as the lowermost value and the uppermost value, respectively.

<Cellulous Acylate Film>

In a cellulous acylate film according to the invention, X-ray diffractive intensity satisfies the following Formulae (I) to (III) and a half-value width of the peak at $2\theta_2$ is more than 3° to 7°.

By appropriately controlling the X-ray diffractive intensity as described below, the cellulous acylate film of the invention can improve both of the optical property and the moisture absorptivity.

$$0.40 \leq Ic_2/(Iam_2+Ic_2) \leq 0.75; \quad \text{Formula (I):}$$

$$Iam_2 = I_1 + \{(I_3-I_1)/(2\theta_3-2\theta_1) \times (2\theta_2-2\theta_1)\}; \quad \text{Formula (II):}$$

and $$Ic_2 = I_2 - Iam_2, \quad \text{Formula (III):}$$

wherein when it is assumed that $\theta$ is the Bragg angle, $2\theta_1$ indicates $2\theta$ at which the intensity becomes the minimum in the $2\theta$ range of 4° to 5°, $2\theta_2$ indicates $2\theta$ at which the intensity becomes the maximum in the $2\theta$ range of 5° to 10°, $2\theta_3$ indicates $2\theta$ at which the intensity becomes the minimum in the $2\theta$ range of 14° to 16°, $I_1$ indicates a diffractive intensity at $2\theta_1$, $I_2$ indicates a diffractive intensity at $2\theta_2$, and $I_3$ indicates a diffractive intensity at $2\theta_3$.

The observation in the sectional view in the same direction as the transport direction means observation in a transverse direction as the film is cut in the transport direction.

Preferably, the upper limit value of $IC_1/Ic_0$ is 100.

[X-ray Diffractive Intensity]

According to the invention, the X-ray diffractive intensity of the cellulose acylate film was obtained (Cu Kα ray 50 kV, 200 mA, 10 minutes) from a diffraction picture of a beam transmitted by adjusting humidity of the film at 25° C. at relative humidity of 60% for 24 hours and then using an automatic X-ray diffracting device (RINT 2000: manufactured by Rigaku Corporation.) and a general-purpose imaging-plate reading device (R-AXIS DS3C/3 CL). Diffraction profiles were evaluated in the whole direction from the obtained diffraction picture. $Iam_2$, $Ic_2$, $Iam_4$ and $Ic_4$ were evaluated from the diffraction profiles in a direction in which peak intensity becomes the maximum in the $2\theta$ range of 5° to 10° in accordance with Formulae (II), (III), (V) and (VI) [$\theta$ is the Bragg angle]. But, a part where a beam is removed by a beam stopper is not interpreted when the $2\theta_1$ is evaluated. In the invention, peak positions are expressed by $2\theta$ at the top (maximum) of the peak. When no peak is detected at $2\theta_4$, $I_4$ is 0.

$$Iam_2 = I_1 + \{(I_3-I_1)/(2\theta_3-2\theta_1) \times (2\theta_2-2\theta_1)\}; \quad \text{Formula (II):}$$

$$Ic_2 = I_2 - Iam_2, \quad \text{Formula (III):}$$

$$Iam_4 = I_1 + \{(I_3-I_1)/(2\theta_3-2\theta_1) \times (2\theta_4-2\theta_1)\}; \quad \text{Formula (V):}$$

and $$Ic_4 = I_4 - Iam_4, \quad \text{Formula (VI)}:$$

wherein when it is assumed that $\theta$ is the Bragg angle, $2\theta_1$ indicates $2\theta$ at which the intensity becomes the minimum in the $2\theta$ range of 4° to 5°, $2\theta_2$ indicates $2\theta$ at which the intensity becomes the maximum in the $2\theta$ range of 5° to 10°, $2\theta_3$ indicates $2\theta$ at which the intensity becomes the minimum in the $2\theta$ range of 14° to 16°, $2\theta_4$ indicates $2\theta$ at the maximum of a peak in the $2\theta$ range of 12.5° to 14°, $I_1$ indicates a diffractive intensity at $2\theta_1$, $I_2$ indicates a diffractive intensity at $2\theta_2$, $I_3$ indicates a diffractive intensity at $2\theta_3$, and $I_4$ indicates a diffractive intensity at $2\theta_4$.

The cellulous acylate film according to the invention is characterized by satisfying the following Formula (I) with respect to $Iam_2$ and $Ic_2$. By allowing $Ic_2/(Iam_2+Ic_2)$ to be in 0.40 or more, the moisture absorptivity can be reduced more effectively. By allowing $Ic_2/(Iam_2+Ic_2)$ to be in 0.75 or less, the retardation of the film can be lower more effectively.

$$0.40 \leq Ic_2/(Iam_2+Ic_2) \leq 0.75 \quad \text{Formula (I)}:$$

It is more preferable that the cellulous acylate film according to the invention satisfies the following Formula (Ia):

$$0.40 \leq Ic_2/(Iam_2+Ic_2) \leq 0.65 \quad \text{Formula (Ia)}:$$

It is further more preferable that the cellulous acylate film according to the invention satisfies the following Formula (Ib):

$$0.45 \leq Ic_2/(Iam_2+Ic_2) \leq 0.60 \quad \text{Formula (Ib)}:$$

In the cellulous acylate film of the invention, a half-value width of the peak at $2\theta_2$ observed in the sectional view in the same direction as the transport direction of the film is more than 3° to 7°, preferably in the range of 3.3° to 6°, and more preferably in the range of 3.5° to 5°.

It is preferable that the cellulous acylate film according to the invention further satisfies the following Formula (IV) with respect to $Iam_4$ and $Ic_4$. By allowing $Ic_4/(Iam_4+Ic_4)$ to be in 0.20 or less, the moisture dependency of the retardation can be reduced more effectively.

$$Ic_4/(Iam_4+Ic_4) \leq 0.20 \quad \text{Formula (IV)}:$$

It is more preferable that the cellulous acylate film according to the invention satisfies the following Formula (IVa):

$$Ic4/(Iam_4+Ic_4) \leq 0.15 \quad \text{Formula (IVa)}:$$

It is further more preferable that the cellulous acylate film according to the invention satisfies the following Formula (IVb):

$$0.001 \leq Ic_4/(Iam_4+Ic_4) \leq 0.10 \quad \text{Formula (IVb)}:$$

It is preferable that the cellulose acylate film according to the invention satisfies Formula (VIIa), where $Ic_{21}$ is $Ic_2$ in a direction in which the peak intensity in the $2\theta$ range of 5° to 10° becomes the maximum, and $IC_{22}$ is $Ic_2$ in a direction perpendicular to the direction in which the peak intensity is the maximum:

$$IC_{21}/IC_{22} < 1000 \quad \text{Formula (VIIa)}:$$

It is more preferable that the cellulose acylate film according to the invention satisfies Formula (VIIb):

$$10 < Ic_{21}/IC_{22} < 1000 \quad \text{Formula (VIIb)}:$$

It is more preferable that the cellulose acylate film according to the invention satisfies Formula (VIIc):

$$20 < Ic_{21}/Ic_{22} < 200 \quad \text{Formula (VIIc)}:$$

[Moisture Absorptivity]

According the invention, the cellulose acylate film was stored in a humidity conditioning for 24 hours at 25° C. and at a relative humidity of 80% RH, and then the moisture absorptivity of the cellulose acylate film at a relative humidity of 80% was measured using an evaporation KF titration system (AQS-2110: Hiranuma Sangyo Co., Ltd).

The moisture absorptivity of the cellulose acylate film at a relative humidity of 80% according to the invention is preferably 3.0% or less, more preferably in the range of 0.1 to 2.7%, and even more preferably in the range of 0.5 to 2.5%.

[Haze]

According to the invention, the haze of the cellulous acylate film was measured by adjusting the humidity of the film at 25° at relative humidity of 60% for 24 hours and then using a haze-meter (NDH 2000: manufactured by NIPPON DENSHOKU KOGYO KABUSHIKI KAISHA).

In general, a haze value of a polymer film increases depending on the increase in X-ray diffractive intensity. However, it is preferable that the haze value is low in the film used for an optical film such as a liquid crystal display device like the invention. The circumstance can be realized in the way to appropriately adjust the peaks at $2\theta_2$ and $2\theta_4$ in the above-described X-ray diffraction profiles. It is preferable that the haze of the cellulose acylate film according to the invention is 2% or less, more preferable 1.5% or less, further more preferable in the range of 0.1% to 1.0%, and the most preferable in the range of 0.1% to 0.5%.

[Sound-Wave Propagation Velocity (Acoustic Velocity)]

In order to achieve the cellulous acylate film of the invention improving both of the optical property and the dynamic property of matter, as described below, it is preferable to control a direction of an in-plane slow-phase axis and a direction in which the sound-wave propagation velocity (hereinafter, referred to as "sound velocity") becomes the maximum.

The direction in which the sound-wave propagation velocity becomes the maximum was evaluated, as a direction in which a propagation velocity of a longitudinal-wave vibrations of ultrasonic pulse becomes the maximum, by adjusting humidity of the film at 25° C. at relative humidity of 60% for 24 hours and then using an alignment-property meter (SST-2500: manufactured by Nomura Shoji Co., Ltd.).

[Retardation]

The retardation in the invention is described. In this description, Re and Rth (unit: nm) are obtained according to the following method. A film to be analyzed is conditioned at 25° C. and a relative humidity of 60% for 24 hours. Using a prism coupler (Model 2010 Prism Coupler, by Metricon) and using a solid laser at 532 nm, the mean refractivity (n) of the film, which is represented by the following formula (a), is obtained at 25° C. and a relative humidity of 60%.

$$(a): n = (n_{TE} \times 2 + n_{TM})/3$$

wherein $n_{TE}$ is the refractive index measured with polarizing light in the in-plane direction of the film; and $n_{TM}$ is the refractive index measured with polarizing light in the normal direction to the face of the film.

Re($\lambda$) and Rth($\lambda$) represent, herein, the retardation in the plane and the retardation in the thickness direction, respectively, at a wavelength of $\lambda$. Re($\lambda$) is measured with KOBRA 21ADH or WR (by Oji Scientific Instruments) while allowing light having the wavelength of $\lambda$ nm to enter in the normal direction of a film.

In case where the film to be measured is a film that is represented by a uniaxial or biaxial indicatrix, Rth(λ) is computed by the following method.

That is, respective Re(λ) s are measured at total eleven points in the normal direction of the film relative to the film surface and in directions inclined every 10° up to 50° on one side from the normal line around an in-plane slow axis (determined by KOBURA 21AD or WR) as an inclination axis (rotation axis) (in case where no slow axis exists, any direction in the plane of the film is defined as a rotation axis) for an incoming light of a wavelength of λ nm, and KOBRA 21ADH or WR computes the Rth(λ) on the basis of the measured retardation, an assumed value of an average refraction index and an input thickness.

In the above instance, when the retardations are expressed as Re and Rth without referring to specific λ, they are the values measured by use of the light in the wavelength of 590 nm. In case where a film has a direction in which the retardation becomes zero at a certain inclination angle from the normal line relative to the film surface around the in-plane slow axis direction (rotation axis), the retardation at an inclination angle greater than the inclination angle is computed by KOBRA 21ADH or WR after changing the sign thereof to negative.

Further, it is also possible to compute Rth according to the following formulae (b) and (c) by measuring the retardation in two arbitrarily inclined directions around the slow axis as the inclination axis (rotation axis) (in case where no slow axis exists, any direction in the plane of the film is defined as a rotation axis), and basing on the measured value, an assumed value on an average refraction index and an input thickness value.

$$Re(\theta) = \left[nx - \frac{ny \times nz}{\sqrt{\left(ny\sin\left(\sin^{-1}\left(\frac{\sin(-\theta)}{nx}\right)\right)\right)^2 + \left(nz\cos\left(\sin^{-1}\left(\frac{\sin(-\theta)}{nx}\right)\right)\right)^2}}\right] \times \frac{d}{\cos\left(\sin^{-1}\left(\frac{\sin(-\theta)}{nx}\right)\right)} \quad (b)$$

Note:

The above Re (θ) represents the retardation in a direction that inclines in the degree of θ from the normal direction. In the formula (b), nx represents the refraction index in the slow axis direction in the plane, ny represents the refraction index in the direction perpendicular to nx in the plane, and nz represents the refraction index in the direction perpendicular to the directions of nx and ny.

$Rth = ((nx+ny)/2 - nz) \times d \ldots$ (c)

In case where the film to be measured is a film that can not be expressed by a uniaxial or biaxial indicatrix, that is, a so-called film having no optic axis, Rth (λ) is computed according to the following method.

Rth (λ) is computed from the retardation that is obtained by measuring the Re(λ) at total eleven points in directions inclined every 10° from −50° up to +50° from the normal line relative to the film surface around an in-plane slow axis (determined by KOBURA 21AD or WR) as an inclination axis (rotation axis) for an incoming light of a wavelength of λ nm entering from each of the directions of inclination, an assumed value of an average refraction index and input thickness with KOBRA 21ADH or WR.

By inputting the value of these average refraction indices and thickness, KOBRA 21ADH or WR computes nx, ny, nz. From the computed nx, ny, nz, Nz=(nx−nz)/(nx−ny) is computed further.

In the present specification, Re (H %) and Rth (H %) represent an in-plane retardation and a retardation in the thickness direction of the film, respectively, at a relative humidity of H (unit: %). These values can be determined by staying the film at 25° C. at relative humidity of H % for 24 hours and measuring the retardations of the film at 25° C. at relative humidity of H % in accordance with the same method as above.

In the retardation value of the cellulous acylate film according to the invention, it is preferable that the in-plane retardation (Re) is 5 nm or less, more preferably in the range of 0 to 4 nm, further more preferably in the range of 0 to 2.5 nm, and the most preferably in the range of 0.1 to 2 nm. It is preferable that the absolute value of retardation (Rth) in the film-thickness direction is less than 20 nm, more preferably in the range of 0 to 15 nm, and further more preferably in the range of 0 to 10 nm and particularly preferably in the range of 0 to 5 nm and further more preferably in the range of 0.1 to 3 nm.

In the cellulous acylate film of the invention, it is preferable that an angle formed by a direction of the in-plane slow-phase axis and a direction in which the sound-wave propagation velocity becomes the maximum is in the range of 0±10° or 90°±10°, more preferably in the range of 0±5° or 90±5°, further more preferably in the range of 0±3° or 90°±3°, and the most preferably in the range of 0±1° or 90°±1°.

[Thickness]

The thickness of the cellulose acylate film of the invention is preferably 20 μm -180 μm, more preferably 40 μm-160 μm, even more preferably 60 μm 140 μm. When the thickness is less than 20 μm, the handling ability upon processing the film for a polarizer, or the curing of the polarizer is undesirable. The thickness unevenness of the cellulose acylate film of the invention is preferably 0-2%, more preferably 0-1.5%, especially preferably 0-1%, in both of the transfer direction and the width direction.

[Moisture Permeability]

Next, moisture permeability is described. The moisture permeability in the invention means an evaluated value from the mass change (g/(m²·day)) before and after humidity conditioning when respective films are used for capping and sealing cups containing calcium chloride to be left under conditions of 40° C. and a relative humidity of 90% for 24 hours.

The moisture permeability rises with the rise of temperature, and also with the rise of humidity, but the relation between the magnitudes of the moisture permeability of films is changeless independently of respective conditions. Therefore, in the invention, the value of mass change at 40° C. and a relative humidity of 90% is employed as the standard.

The moisture permeability of the cellulose acylate film of the invention is preferably 100-400 g/(m²·day). The use of a film having the moisture permeability of 100-400 g/(m²·day) allows the film to be stuck directly to a polarizing film. The moisture permeability is preferably 100-350 g/(m²·day), more preferably 150-300 g/(m²·day).

[Cellulose Acylate]

Examples of the polymer which is the constitutive element of the cellulose acylate film of the invention include a cellulose acylate compound, and a compound having acyl-substituted cellulose skeleton obtained by biologically or chemically introducing a functional group into a basic material, which is cellulose.

The polymer may be powdery or granular, or may be pelletized.

Preferably, the moisture absorptivity of the polymer is at most 1.0% by mass, more preferably at most 0.7% by mass, most preferably at most 0.5% by mass. As the case may be, the moisture absorptivity may be preferably at most 0.2% by mass. In case where the moisture absorptivity of the polymer is outside the preferred range, then it is desirable that the polymer is dried by heating before use.

One or more such polymers may be used herein either singly or as combined.

Cellulose acylate is preferably used for the main component polymer of the cellulose acylate film of the invention. The "main component polymer" as referred to herein is meant to indicate the polymer itself when the film is formed of a single polymer, and when the film is formed of different polymers, then it indicates the polymer having the highest mass fraction of all the polymers constituting the film.

The cellulose acylate is an ester of cellulose with an carboxylic acid. The acid to constitute the ester is preferably a fatty acid having from 2 to 22 carbon atoms, more preferably a lower fatty acid having from 2 to 4 carbon atoms.

In the cellulose acylate, all or a part of the hydrogen atoms of the hydroxyl groups existing at the 2-, 3- and 6-positions of the glucose unit constituting the cellulose are substituted with an acyl group. Examples of the acyl group are acetyl, propionyl, butyryl, isobutyryl, pivaloyl, heptanoyl, hexanoyl, octanoyl, decanoyl, dodecanoyl, tridecanoyl, tetradecanoyl, hexadecanoyl, octadecanoyl, cyclohexanecarbonyl, oleoyl, benzoyl, naphthylcarbonyl and cinnamoyl. The acyl group is preferably acetyl, propionyl, butyryl, dodecanoyl, octadecanoyl, pivaloyl, oleoyl, benzoyl, naphthylcarbonyl, cinnamoyl, most preferably acetyl, propionyl, butyryl.

The cellulose ester may be an ester of cellulose with different carboxylic acids. The cellulose acylate may be substituted with different acyl groups.

For the cellulose acylate film of the invention, a substitution degree of acyl is preferably 2.50 to 3.00. It is more preferred that cellulose acylate has the substitution degree of acyl of 2.70 to 2.98, even more preferably 2.80 to 2.95, most preferably 2.85 to 2.94.

Regarding a method for producing cellulose acylate, its basic principle is described in *Wood Chemistry* by Nobuhiko Migita et al., pp. 180-190 (Kyoritsu Publishing, 1968). One typical method for producing cellulose acylate is a liquid-phase acylation method with carboxylic acid anhydride-carboxylic acid-sulfuric acid catalyst. Concretely, a starting material for cellulose such as cotton linter or woody pulp is pretreated with a suitable amount of a carboxylic acid such as acetic acid, and then put into a previously-cooled acylation mixture for esterification to produce a complete cellulose acylate (in which the overall substitution degree of acyl group in the 2-, 3- and 6-positions is nearly 3.00). The acylation mixture generally includes a carboxylic acid serving as a solvent, a carboxylic acid anhydride serving as an esterifying agent, and sulfuric acid serving as a catalyst. In general, the amount of the carboxylic acid anhydride to be used in the process is stoichiometrically excessive over the overall amount of water existing in the cellulose that reacts with the anhydride and that in the system.

Next, after the acylation, the excessive carboxylic acid anhydride still remaining in the system is hydrolyzed, for which, water or water-containing acetic acid is added to the system. Then, for partially neutralizing the esterification catalyst, an aqueous solution that contains a neutralizing agent (e.g., carbonate, acetate, hydroxide or oxide of calcium, magnesium, iron, aluminium or zinc) may be added thereto. Then, the resulting complete cellulose acylate is saponified and ripened by keeping it at 20 to 90° C. in the presence of a small amount of an acylation catalyst (generally, sulfuric acid remaining in the system), thereby converting it into a cellulose acylate having a desired substitution degree of acyl group and a desired polymerization degree. At the time when the desired cellulose acylate is obtained, the catalyst still remaining in the system is completely neutralized with the above-mentioned neutralizing agent; or the catalyst therein is not neutralized, and the cellulose acylate solution is put into water or diluted acetic acid (or water or diluted acetic acid is put into the cellulose acylate solution) to thereby separate the cellulose acylate, and thereafter this is washed and stabilized to obtain the intended product, cellulose acylate.

Preferably, the polymerization degree of the cellulose acylate is from 150 to 500 as the viscosity-average polymerization degree thereof, more preferably from 200 to 400, even more preferably from 220 to 350. The viscosity-average polymerization degree may be measured according to a limiting viscosity method by Uda et al. (Kazuo Uda, Hideo Saito; *Journal of the Fiber Society of Japan*, Vol. 18, No. 1, pp. 105-120, 1962). The method for measuring the viscosity-average polymerization degree is described also in JP-A-9-95538.

Cellulose acylate where the amount of low-molecular components is small may have a high mean molecular weight (high polymerization degree), but its viscosity may be lower than that of ordinary cellulose acylate. Such cellulose acylate where the amount of low-molecular components is small may be obtained by removing low-molecular components from cellulose acylate produced in an ordinary method. The removal of low-molecular components may be attained by washing cellulose acylate with a suitable organic solvent. Cellulose acylate where the amount of low-molecular components is small may be obtained by synthesizing it. In case where cellulose acylate where the amount of low-molecular components is small is synthesized, it is desirable that the amount of the sulfuric acid catalyst in acylation is controlled to be from 0.5 to 25 parts by mass relative to 100 parts by mass of cellulose. When the amount of the sulfuric acid catalyst is controlled to fall within the range, then cellulose acylate having a preferable molecular weight distribution (uniform molecular weight distribution) can be produced.

The starting material, cotton for cellulose ester and methods for producing it are described also in Hatsumei Kyokai Disclosure Bulletin (No. 2001-1745, issued Mar. 15, 2001, Hatsumei Kyokai), pp. 7-12.

[Production of Cellulose Acylate Film]

The cellulose acylate film of the invention may be produced from a cellulose acylate solution that contains cellulose acylate and various additives, according to a method of solution casting film formation. In case where the melting point of the cellulose acylate of the invention or the melting point of a mixture of the cellulose acylate with various additives is lower than the decomposition temperature thereof and is higher than the stretching temperature thereof, then the polymer film may also be produced according to a method of melt film formation. The melting point of the cellulose acylate film is measured by the measuring method described later in an example of the invention. The cellulose acylate film of the invention may be produced according to such a method of melt film formation, and the method of melt film formation is described in JP-A-2000-352620.

[Cellulose Acylate Solution]

(Solvent)

The cellulose acylate film of the invention may be produced, for example, according to a method of solution casting film formation where a cellulose acylate solution that contains a polymer and optionally various additives is cast into a film.

The main solvent of the cellulose acylate solution to be used in producing the cellulose acylate film of the invention is preferably an organic solvent that is a good solvent for the cellulose acylate. The organic solvent of the type is preferably one having a boiling point of not higher than 80° C. from the viewpoint of reducing the load in drying. More preferably, the organic solvent has a boiling point of from 10 to 80° C., even more preferably from 20 to 60° C. As the case may be, an organic solvent having a boiling point of from 30 to 45° C. may also be preferably used for the main solvent.

The main solvent includes halogenohydrocarbons, esters, ketones, ethers, alcohols and hydrocarbons, which may have a branched structure or a cyclic structure. The main solvent may have two or more functional groups of any of esters, ketones, ethers and alcohols (i.e., —O—, —CO—, —COO—, —OH). Further, the hydrogen atoms in the hydrocarbon part of these esters, ketones, ethers and alcohols may be substituted with a halogen atom (especially, fluorine atom). Regarding the main solvent of the cellulose acylate solution to be used in producing the cellulose acylate film of the invention, when the solvent of the solution is a single solvent, then it is the main solvent, but when the solvent is a mixed solvent of different solvents, then the main solvent is the solvent having the highest mass fraction of all the constitutive solvents.

The halogenohydrocarbon is preferably a chlorohydrocarbon, including dichloromethane and chloroform, and dichloromethane is more preferred.

The ester includes, for example, methyl formate, ethyl formate, methyl acetate, ethyl acetate.

The ketone includes, for example, acetone, methyl ethyl ketone.

The ether includes, for example, diethyl ether, methyl tert-butyl ether, diisopropyl ether, dimethoxymethane, 1,3-dioxolan, 4-methyldioxolan, tetrahydrofuran, methyltetrahydrofuran, 1,4-dioxane.

The alcohol includes, for example, methanol, ethanol, 2-propanol.

The hydrocarbon includes, for example, n-pentane, cyclohexane, n-hexane, benzene, toluene.

The organic solvent that may be combined with the main solvent includes halogenohydrocarbons, esters, ketones, ethers, alcohols and hydrocarbons, which may have a branched structure or a cyclic structure. The organic solvent may have two or more functional groups of any of esters, ketones, ethers and alcohols (i.e., —O—, —CO—, —COO—, —OH). Further, the hydrogen atoms in the hydrocarbon part of these esters, ketones, ethers and alcohols may be substituted with a halogen atom (especially, fluorine atom).

The halogenohydrocarbon is preferably a chlorohydrocarbon, including dichloromethane and chloroform, and dichloromethane is more preferred.

The ester includes, for example, methyl formate, ethyl formate, propyl formate, pentyl formate, methyl acetate, ethyl acetate, pentyl acetate.

The ketone includes, for example, acetone, methyl ethyl ketone, diethyl ketone, diisobutyl ketone, cyclopentanone, cyclohexanone, methylcyclohexanone.

The ether includes, for example, diethyl ether, methyl tert-butyl ether, diisopropyl ether, dimethoxymethane, dimethoxyethane, 1,4-dioxane, 1,3-dioxolan, 4-methyldioxolan, tetrahydrofuran, methyltetrahydrofuran, anisole, phenetole.

The alcohol includes, for example, methanol, ethanol, 1-propanol, 2-propanol, 1-butanol, 2-butanol, tert-butanol, 1-pentanol, 2-methyl-2-butanol, cyclohexanol, 2-fluoroethanol, 2,2,2-trifluoroethanol, 2,2,3,3-tetrafluoro-1-propanol.

The hydrocarbon includes, for example, n-pentane, cyclohexane, n-hexane, benzene, toluene, xylene.

The organic solvent having two or more different types of functional groups includes, for example, 2-ethoxyethyl acetate, 2-methoxyethanol, 2-butoxyethanol, methyl acetacetate.

It is desirable that the total solvent for it contains from 5% to 30% by mass, more preferably from 7% to 25% by mass, even more preferably from 10% to 20% by mass of alcohol from the viewpoint of reducing the load for film peeling from band.

Preferred examples of the combination of organic solvents for use as the solvent in the cellulose acylate solution to be used in producing the cellulose acylate film of the invention are mentioned below, to which, however, the invention should not be limited. The numerical data for ratio are parts by mass.

(1) Dichloromethane/methanol/ethanol/butanol=80/10/5/5
(2) Dichloromethane/methanol/ethanol/butanol=80/5/5/10
(3) Dichloromethane/isobutyl alcohol=90/10
(4) Dichloromethane/acetone/methanol/propanol=80/5/5/10
(5) Dichloromethane/methanol/butanol/cyclohexane=80/8/10/2
(6) Dichloromethane/methyl ethyl ketone/methanol/butanol=80/10/5/5
(7) Dichloromethane/butanol=90/10
(8) Dichloromethane/acetone/methyl ethyl ketone/ethanol/butanol=68/10/10/7/5
(9) Dichloromethane/cyclopentanone/methanol/pentanol=80/2/15/3
(10) Dichloromethane/methyl acetate/ethanol/butanol=7d/12/15/3
(11) Dichloromethane/methyl ethyl ketone/methanol/butanol=80/5/5/10
(12) Dichloromethane/methyl ethyl ketone/acetone/methanol/pentanol=50/20/15/5/10
(13) Dichloromethane/1,3-dioxolan/methanol/butanol=70/15/5/10
(14) Dichloromethane/dioxane/acetone/methanol/butanol=75/5/10/5/5
(15) Dichloromethane/acetone/cyclopentanone/ethanol/isobutyl alcohol/cyclohexanone=60/18/3/10/7/2
(16) Dichloromethane/methyl ethyl ketone/acetone/isobutyl alcohol=70/10/10/10
(17) Dichloromethane/acetone/ethyl acetate/butanol/hexane=69/10/10/10/1
(18) Dichloromethane/methyl acetate/methanol/isobutyl alcohol=65/15/10/10
(19) Dichloromethane/cyclopentanone/ethanol/butanol=85/7/3/5
(20) Dichloromethane/methanol/butanol=83/15/2
(21) Dichloromethane=100
(22) Acetone/ethanol/butanol=80/15/5
(23) Methyl acetate/acetone/methanol/butanol=75/10/10/5
(24) 1,3-dioxolan=100
(25) Dichloromethane/methanol=92/8
(26) Dichloromethane/methanol=90/10
(27) Dichloromethane/methanol=87/13
(28) Dichloromethane/ethanol=90/10

A detailed description of a case where a non-halogen organic solvent is the main solvent is given in Hatsumei Kyokai Disclosure Bulletin (No. 2001-1745, issued Mar. 15, 2001, Hatsumei Kyokai), which may be conveniently referred to herein.

(Solution Concentration)

The polymer concentration in the cellulose acylate solution to be prepared herein is preferably from 5% to 40% by mass, more preferably from 10% to 30% by mass, most preferably from 15% to 30% by mass.

The polymer concentration may be so controlled that it could be a predetermined concentration in the stage where polymer is dissolved in solvent. Apart from it, a solution having a low concentration (e.g., from 4% to 14% by mass) is previously prepared, and then it may be concentrated by evaporating the solvent from it. On the other hand, a solution having a high concentration is previously prepared, and it may be diluted. The polymer concentration in the solution may also be reduced by adding additive thereto.

(Additive)

The cellulose acylate solution to be used for producing the cellulose acylate film of the invention may contain various liquid or solid additives in accordance with the use of the film, in the steps of producing it. Examples of the additives are plasticizer (its preferred amount is from 0.01% to 20% by mass of the polymer—the same shall apply hereunder), UV absorbent (0.001% to 1% by mass), powdery particles having a mean particle size of from 5 to 3000 nm (0.001% to 1% by mass), fluorine-containing surfactant (0.001% to 1% by mass), release agent (0.0001% to 1% by mass), antioxidant (0.0001% to 1% by mass), optical anisotropy-controlling agent (0.01% to 10% by mass), IR absorbent (0.001% to 1% by mass).

The plasticizer and the optical anisotropy-controlling agent are compounds having both a hydrophobic part and a hydrophilic part. These compounds are aligned between the polymer chains, thereby changing the retardations of the film. When the compounds are combined with cellulose acylate that is especially preferably used in the invention, the compounds may improve the hydrophobicity of the film and may reduce the humidity-dependent change of the retardation thereof. In addition, when the compounds are combined with the UV absorbent or IR absorbent, the compounds may effectively control the wavelength dependence of the retardation of the polymer film. The additives to be used in the cellulose acylate film of the invention are preferably those not substantially evaporating in the step of drying the film.

From the viewpoint of the reduction in retardation humidity variation, it is preferable that the additive amount of the additives is large. However, as the additive amount increases, the glass transition temperature (Tg) of the polymer film is reduced or the additives easily volatilize in the film ring process. Accordingly, when the cellulose acetate more preferably used in the invention is used as a polymer, the additive amount of an additive having a molecular weight not greater than 3000 is preferably in the range of 0 to 20% by mass, more preferably in the range of 0 to 12% by mass, and even more preferably in the range of 0.2 to 10% by mass as compared with that added to the cellulose acylate. An additive having an effect on the reduction in retardation has a low molecular weight or has a chemical constitution with small interaction between molecules, and thus easily volatilizes. Accordingly, the additives having no effect on the reduction in retardation is used in the invention.

For the plasticizer or the optical anisotropy-controlling agent which can be suitably used in case that cellulose acylate is used as a polymer which constitutes the cellulose acylate film, specifically, there can be exemplified a plasticizer described in JP-A-2005-104148 [0197] to [0202], and an optical anisotropy-controlling agent described in JP-A-2005-104148 [0227] to [0449]. For the IR absorbent, it is described in JP-A-2001-194522 as an example. The time of adding the additives may be properly determined depending on the types of the additives. For the additives, it is described in Hatsumei Kyokai Disclosure Bulletin (No. 2001-1745, issued Mar. 15, 2001, Hatsumei Kyokai) on pages 16 to 22.

(Preparation of Cellulose Acylate Solution)

The cellulose acylate solution may be prepared, for example, according to the methods described in JP-A-56-127737, JP-A-61-106628, JP-A-2-276830, JP-A-4-259511, JP-A-5-163301, JP-A-9-95544, JP-A-10-45950, JP-A-10-95854, JP-A-11-71463, JP-A-11-302388, JP-A-11-322946, JP-A-11-322947, JP-A-11-323017, JP-A-2000-53784, JP-A-2000-273184 and JP-A-2000-273239. Concretely, cellulose acylate and solvent are mixed and stirred so that the cellulose acylate is swollen, and as the case may be, this is cooled or heated so as to dissolve the cellulose acylate, and thereafter this is filtered to obtain a cellulose acylate solution.

According to the invention, in order to improve solubility of cellulose acylate in a solvent, there is included a process of cooling and/or heating a mixture of cellulose acylate and a solvent.

In case of cooling the mixture of cellulose acylate and a solvent in which a halogen-containing organic solvent is used as the solvent, it is preferred to include a process of cooling the mixture at −100 to 10° C. Further, it is preferred to include a process of swelling the mixture at −10 to 39° C. before the process of cooling, and a process of heating the mixture at 0 to 39° C. after the process of cooling.

In case of heating the mixture of cellulose acylate and a solvent in which a halogen-containing organic solvent is used as the solvent, it is preferred to include a process of dissolving the cellulose acylate in the solvent according to at least one of the following methods (a) and (b).

(a): A mixture is swollen at −10 to 39° C., and then heated at 0 to 39° C.

(b): A mixture is swollen at −10 to 39° C., and then heated at 40 to 240° C. under pressure of 0.2 to 30 MPa. After that, the mixture is cooled at 0 to 39° C.

In addition, in case of cooling the mixture of cellulose acylate and a solvent in which a non-halogen-containing organic solvent is used as the solvent, it is preferred to include a process of cooling the mixture at −100 to −10° C. Further, it is preferred to include a process of swelling the mixture at −10 to 55° C. before the process of cooling, and a process of heating the mixture at 0 to 57° C. after the process of cooling.

In case of heating the mixture of cellulose acylate and a solvent in which a non-halogen-containing organic solvent is used as the solvent, it is preferred to include a process of dissolving the cellulose acylate in the solvent according to at least one of the following methods (c) and (d).

(c): A mixture is swollen at −10 to 55° C., and then heated at 0 to 57° C.

(d): A mixture is swollen at −10 to 55"C, and then heated at 40 to 240° C. under pressure of 0.2 to 30 MPa. After that, the mixture is cooled at 0 to 57° C.

[Casting, Drying]

The cellulose acylate film of the invention may be produced according to a conventional method of solution casting film formation, using a conventional apparatus for solution casting film formation. Concretely, a dope (polymer solution) prepared in a dissolver (tank) is filtered, and then once stored in a storage tank in which the dope is degassed to be a final dope. The dope is kept at 30° C., and fed into a pressure die from the dope discharge port of the tank, via a metering pressure gear pump through which a predetermined amount of the dope can be fed with accuracy, for example, based on the controlled revolution thereof, and then the dope is uniformly cast onto the metal support of a casting unit that runs endlessly, via the slit of the pressure die (casting step). Next, at a peeling point at which the metal support reaches almost after having traveled round the drum, a semi-dried dope film (this may be referred to as a web) is peeled from the metal support, and then transported to a drying zone in which the web is dried while conveyed with rolls therein. In this invention, the metal support is preferably a metal belt or metal drum.

Thus dried film has a residual solvent amount of preferably 0-2% by mass, more preferably 0-1% by mass. This film may be directly transported to a stretching zone or heat treatment zone, or may be wound and then subjected to stretching or heat treatment in off-line operation. The film has a width of preferably 0.5-5 m, more preferably 0.7-3 m. When the film is once wound, the wound length is preferably 300-30000 m, more preferably 500-10000 m, even more preferably 1000-7000 m.

[Heating Process]

According to the invention, in order to be compatible with the optical characteristic and the moisture absorptivity, it is important to appropriately control the heating temperature and the total substitution degree of the cellulose acylate for the case where the formed cellulose acylate film is heated, whereby the peaks at $2\theta_2$ and $2\theta_4$ in the X-ray diffraction of a structure can be appropriately adjusted. Since two components having different sing for natural birefringence can be generated in the cellulose acylate film, it is possible to obtain the cellulose acylate film in which the retardation is not expressed, without being dependent on the extension ratio. Thus, this method can produce a cellulose acylate film inhibiting retardation unevenness regardless of deformation of the film produced in the conventional production process.

The method of the invention includes the processes of transporting the cellulous acylate film and performing the heat treatment in which the cellulous acylate film is maintained at $(-285 \times S + 970)°$ C. to less than $(-285 \times S + 1000)°$ C. when it is assumed that the whole substitution degree is defined as S. The temperature of the heat treatment is more preferably in the range of $(-285 \times S + 975)°$ C. to less than $(-285 \times S + 1000)°$ C., further more preferably in the range of $(-285 \times S + 980)°$ C. to (melting point $-5$)° C., and the most preferably in the range of $(-285 \times S + 985)°$ C. to less than $(-285 \times S + 995)°$ C.

Cellulose acylate films achieving the object of the invention can be produced by heat-treating a cellulose acylate film having a substitution degree S of 2.85 at a temperature of 158° C. to 188° C. or heat-treating a cellulose acylate film having a substitution degree S of 2.80 at a temperature of 172° C. to 202° C. Based on these fact, the temperature range at the heat treatment, $(-285 \times S + 970)°$ C. to less than $(-285 \times S + 1000)°$ C., is derived. Other cellulose acylate films achieving the object of the invention can be produced by heat-treating a cellulose acylate film having a substitution degree S other than 2.85 and 2.80 in the temperature range calculated by the above formula.

A cellulose acylate film showing a low retardation generation can be produced by properly adjusting the substitution degree of the cellulose acylate film and the temperature at the heat treatment regardless of film deformation. Thus, the method of the invention can produce a cellulose acylate film inhibiting retardation unevenness regardless of film deformation produced in the production process. The method of the invention can produce a cellulose aclate film having a reduced moisture absorptivity. Particularly, a cellulose acylate film having a low optical anisotropy and low humidity dependency of the optical anisotropy can be produced by reducing an extension ratio in the heat treatment.

It is particularly preferable that the heat treatment process includes a process of contracting the film in the width direction for improving both of the optical property and the moisture absorptivity. The contracting process in the width direction may be included in the heat treatment process. In addition, the heat treatment process or the process before or after the heat treatment process may further include a process of extending the film in the width direction. In order to effectively reduce a humidity dependency of retardation, it is particularly preferable to lower the extension ratio in the heat treatment.

The contracting process in the width direction may be performed to one end and the contracting process and the extending process may be repeatedly performed.

The amount of residual solvent of the cellulose acylate film before it is inserted into a heat treatment zone is preferably 3% or less by mass, more preferably in the range of 0.01% to 2% by mass, further more preferably in the range of 0.1% to 1.5% by mass. The amount of residual solvent of the cellulose acylate film is calculated by following formula.

AMOUNT OF RESIDUAL SOLVENT (mass %)={$(M-N)/N$}×100

[Where M indicates a mass of the cellulose acylate film before it is inserted into a heat treatment zone and N indicates a mass when the cellulous acylate film is allowed to be dry at 110° C. for 3 hours before it is inserted into the heat treatment zone.]

The contraction ratio of the film is preferably in the range of 0.1% to 80% before and after the process of contracting the film in the width direction, more preferably in the range of 1% to 60%, further more preferably in the range of 3% to 50%, and the most preferably in the range of 5% to 40%.

When the end portion of the film is gripped by a tenter clip, the contraction ratio in the width direction can be controlled with the ratio of a broaden width of a rail. When the end portion of the film is not fixed and is held by only a device fixing the film in the transport direction such as a nip roll, the contraction ratio can be controlled by adjusting a distance between devices fixing the film in the transport direction, adjusting a tension applied to the film, adjusting the amount of heat given to the film, or the like. The contraction ratio in the width direction was evaluated by measuring the whole width before and after contracting the film.

Contraction Ratio in width direction (%)=100× (whole width before contraction-whole width after contraction)/whole width before contraction In addition, by setting the temperature of the heat treatment as described above, it is possible to manufacture the cellulous acylate film having the small Re of the invention. The heat treatment is generally performed for 0.01 minute or more and less than 60 minutes, preferably from 0.03 to 10 minutes, and more preferably from 0.05 to 5 minutes.

[Stretching]

In order to adjust the value of Re and Rth, it is preferred that the cellulose acylate film being transported into a heat treatment zone is subjected to the heat treatment and the stretching at the same time, or the cellulose acylate film may be subjected to the stretching after being subjected to the heat treatment.

(Stretching Method)

For the stretching, longitudinal stretching may be carried out, for example, in the apparatuses having a heating zone between two or more apparatuses (for example, nip rolls, suction drum) which maintains the film in transport direction, in which the circumferential velocity on an exit side is larger, or stretching by grasping the both ends of the film with chucks for widening the film in the direction perpendicular to the transport direction may be carried out. Otherwise, the above both stretching method may be carried out in combination thereof.

In case that the cellulose acylate film is subjected to the stretching after being subjected to the heat treatment, first, the film may be cooled after the heat treatment and then, preferably, subjected to the stretching process. In such a case, it is preferred that the film is subjected to the heat treatment by being transported to and then passed through the heat treatment zone; and the film is subjected to the stretching by grasping the both ends of the film with chucks for widening the film in the direction perpendicular to the transport direction.

The stretching ratio can be arbitrarily set in accordance with the retardation desired for the film, and is preferably in the range of 3 to 500%, more preferably in the range of 5 to 100%, even more preferably in the range of 10 to 80%, and especially preferably in the range of 20 to 60%. The stretching may be effected in one step operation or multi-step operation. The 'stretching ratio (%)' herein means a value obtained by using the following formula.

Stretching ratio (%)=100×{(length after stretching)−(length before stretching})/length before stretching The stretching velocity in the stretching is preferably in the range of 10 to 10000%/min, more preferably in the range of 20 to 1000%/min, and even more preferably in the range of 30 to 800%/min.

The cellulose acylate film of the invention has preferably a monolayer structure. A film having a monolayer structure is a polymer film of one sheet, instead of one composed of a plurality of stuck film materials. Also included is one sheet of polymer film produced from a plurality of polymer solutions by a sequential flow casting system or co-flow casting system. In this case, a polymer film having a distribution in the thickness direction can be obtained by suitably adjusting the type or blending amount of an additive, the molecular weight distribution of the polymer, or the type of the polymer, etc. Also included is a film having various functional portions such as an optical anisotropic portion, an antiglare portion, a gas barrier portion or a moisture resistant portion in one film.

[Surface Treatment]

The cellulose acylate film of the invention may be surface-treated in any desired manner to thereby improve its adhesiveness to various functional layers (e.g., undercoat layer, back layer, optically anisotropic layer). The surface treatment includes glow discharge treatment, UV irradiation treatment, corona treatment, flame treatment, saponification treatment (acid saponification treatment, alkali saponification treatment). In particular, glow discharge treatment and alkali saponification treatment are preferred. The "glow discharge treatment" as referred to herein is a plasma treatment of treating a film surface in the presence of a plasma-exciting vapor. The details of the surface treatment are described in Hatsumei Kyokai Disclosure Bulletin (No. 2001-1745, issued Mar. 15, 2001, Hatsumei Kyokai), and may be conveniently referred to herein.

For improving the adhesiveness between the film surface of the cellulose acylate film of the invention and a functional layer to be formed thereon, an undercoat layer (adhesive layer) maybe formed on the film in place of or in addition to the surface treatment as above. The undercoat layer is described in Hatsumei Kyokai Disclosure Bulletin (No. 2001-1745, issued Mar. 15, 2001, Hatsumei Kyokai), page 32, which may be conveniently referred to herein. Functional layers that may be formed on the cellulose acylate film of the invention are described in Hatsumei Kyokai Disclosure Bulletin (No. 2001-1745, issued Mar. 15, 2001, Hatsumei Kyokai), pp. 32-45, which may be conveniently referred to herein.

<<Retardation Film>>

The cellulose acylate film of the invention may be used as a retardation film. "Retardation film" means an optical material that is generally used in display devices such as liquid crystal display devices and has optical anisotropy, and its meaning may be the same as that of retarder, optical compensatory film, and optical compensatory sheet. In a liquid crystal display device, the retardation film is used for the purpose of increasing the contrast of the display panel and improving the viewing angle characteristic and the coloration thereof.

Using the cellulose acylate film of the invention makes it easy to produce a retardation film of which Re and Rth can be controlled in any desired manner. For example, as a retardation film of which the retardation does not change dependently of the inclination angle to the slow axis direction, a film that satisfies Re≧50 nm and |Rth|≦15 nm can be favorably produced; and a film that satisfies Re≧100 nm and |Rth|≦10 nm can be produced more favorably.

The cellulose acylate film of the invention may be used as a retardation film directly as it is. Plural sheets of the cellulose acylate film of the invention may be laminated, or the cellulose acylate film of invention may be laminated with any other film not falling within the scope of the invention, and the resulting laminate films thus having suitably controlled Re and Rth may also be used as retardation films. For laminating the films, a paste or an adhesive may be used.

As the case may be, the cellulose acylate film of the invention may be used as a support of retardation films. An optically anisotropic layer of liquid crystal may be provided on the support to give a retardation film. The optical-anisotropic layer applicable to the retardation film of the invention may be formed of, for example, a composition containing a liquid crystalline compound or a polymer film having birefringence.

The liquid crystalline compound is preferably a discotic liquid crystalline compound or a rod-shaped liquid crystalline compound.

[Discotic Liquid crystalline Compound]

Examples of the discotic liquid crystalline compound usable in the invention are described in various publications (e.g., C. Destrade et al., *Mol. Cryst. Liq. Cryst.*, Vol. 71, page 111 (1981); *Quarterly Outline of Chemistry*, No. 22, Chemistry of Liquid Crystal, Chap. 5, Chap. 10, Sec. 2 (1994), by the Chemical Society of Japan; B. Kohne et al., *Angew. Chem. Soc. Chem. Comm.*, page 1794 (1985); J. Zhang et al., *J. Am. Chem. Soc.*, Vol. 116, page 2655 (1994)).

Preferably, the discotic liquid crystalline molecules are fixed as aligned in the optically anisotropic layer; and most preferably, they are fixed through polymerization. The polymerization of discotic liquid crystalline molecules is described in JP-A-8-27284. For fixing discotic liquid crystalline molecules through polymerization, it is necessary that a substituent of a polymerizing group is bonded to the disc core of the discotic liquid crystalline molecules. However, when a polymerizing group is directly bonded to the disc core, then the molecules could hardly keep their alignment condition during the polymerization. Accordingly, a linking group is introduced between the disc core and the polymerizing group. The discotic liquid crystalline molecules having a polymerizing group are disclosed in JP-A-2001-4387.

[Rod-shaped Liquid crystalline Compound]

Examples of the rod-shaped liquid crystalline compound usable in the invention are azomethines, azoxy compounds, cyanobiphenyls, cyanophenyl esters, benzoates, phenyl cyclohexanecarboxylates, cyanophenylcyclohexanes, cyano-substituted phenylpyrimidines, alkoxy-substituted phenylpyrimidines, phenyldioxanes, tolans and alkenylcyclohexylbenzonitriles. However, not limited to such low-molecular rod-shaped liquid crystalline compounds, also usable herein are high-molecular rod-shaped liquid crystal compounds.

In the optically anisotropic layer, the rod-shaped liquid crystalline molecules are preferably fixed as aligned therein; and most preferably, they are fixed through polymerization. Examples of the polymerizing rod-shaped liquid crystalline compound usable in the invention are described, for example, in *Macromol. Chem.*, Vol. 190, page 2255 (1989); *Advanced materials*, Vol. 5, page 107 (1993); U.S. Pat. No. 4,683,327, U.S. Pat. No. 5,622,648, U.S. Pat. No. 5,770,107; WO95/22586, WO95/24455, WO97/00600, WO98/23580, WO98/52905; JP-A-1-272551, JP-A-6-16616, JP-A-7-110469, JP-A-11-80081 and JP-A-2001-328973.

(Optically anisotropic Layer of Polymer Film)

The optically anisotropic layer maybe formed of a polymer film. The polymer film may be made of a polymer capable of expressing optical anisotropy. Examples of the polymer capable of expressing optical anisotropy are polyolefins (e.g., polyethylene, polypropylene, norbornenic polymer), polycarbonates, polyarylates, polysulfones, polyvinyl alcohols, polymethacrylates, polyacrylates, and cellulose esters (e.g., cellulosetriacetate, cellulose diacetate). The polymer may be a copolymer or a polymer mixture of these polymers.

<<Polarizer>>

The cellulose acylate film or the retardation film of the invention may be used as a protective film of a polarizer (polarizer of the invention). The polarizer of the invention comprises a polarizing film and two polarizer-protective films (cellulose acylate films) that protect both surfaces of the film, in which the cellulose acylate film or the retardation film of the invention may be used as at least one of the polarizer-protective films.

In case where the cellulose acylate film of the invention is used as the polarizer-protective film, then it is desirable that the cellulose acylate film of the invention is subjected to the above-mentioned surface treatment (described also in JP-A-6-94915, JP-A-6-118232) for hydrophilication. For example, the film is preferably subjected to glow discharge treatment, corona discharge treatment or alkali saponification treatment. In particular, when the polymer to constitute the cellulose acylate film of the invention is cellulose acylate, then the surface treatment is most preferably alkali saponification treatment.

For the polarizing film, for example, herein usable is a polyvinyl alcohol film dipped and stretched in an iodine solution. In case where such a polyvinyl alcohol dipped and stretched in an iodine solution is used as the polarizing film, then the treated surface of the cellulose acylate film of the invention may be directly stuck to both surfaces of the polarizing film with an adhesive. In the production method of the invention, it is desirable that the cellulose acylate film is directly stuck to the polarizing film in that manner. The adhesive may be an aqueous solution of polyvinyl alcohol or polyvinyl acetal (e.g., polyvinyl butyral), or a latex of vinylic polymer (e.g., polybutyl acrylate). An especially preferred example of the adhesive is an aqueous solution of completely-saponified polyvinyl alcohol.

In a liquid crystal display device, in general, a liquid crystal cell is provided between two polarizers, and therefore, the device has four polarizer-protective films. The cellulose acylate film of the invention may be used as any of the four polarizer-protective films. Especially advantageously in such a liquid crystal display device, the cellulose acylate film of the invention is used as the protective film to be disposed between the polarizing film and the liquid crystal layer (liquid crystal cell). On the protective film to be disposed on the opposite side to the cellulose acylate film of the invention via the polarizing film there between, optionally provided is a transparent hard-coat layer, an antiglare layer or an antireflection layer. In particular, the film of the invention is favorably used as the polarizer-protective film on the outermost side of the display panel of a liquid crystal display device.

<<Liquid crystal Display Device>>

The transparent polymer film, the retardation film and the polarizer of the invention may be used in liquid crystal display devices of various display modes. Liquid crystal display modes to which the films are applicable are described below. Of those modes, the transparent polymer film, the retardation film and the polarizer of the invention are favorably used in liquid crystal display devices of VA mode and IPS mode. The liquid crystal display devices may be any of transmission type, reflection type or semi-transmission type.

(TN-Type Liquid crystal Display Device)

The transparent polymer film of the invention may be used as a support of the retardation film in a TN-type liquid crystal display device having a TN-mode liquid crystal cell. TN-mode liquid crystal cells and TN-type liquid crystal display devices are well known from the past. The retardation film to be used in TN-type liquid crystal display devices is described in JP-A-3-9325, JP-A-6-148429, JP-A-8-50206, JP-A-9-26572; and Mori et al's reports (*Jpn. J. Appl. Phys.*, Vol. 36 (1997), p. 143; *Jpn. J. Appl. Phys.*, Vol. 36 (1997), p. 1068).

(STN-Type Liquid crystal Display Device)

The transparent polymer film of the invention may be used as a support of the retardation film in an STN-type liquid crystal display device having an STN-mode liquid crystal cell. In general, in an STN-type liquid crystal display device, the rod-shaped liquid crystalline molecules in the liquid crystal cell are twisted within a range of from 90 to 360 degrees, and the product ($\Delta nd$) of the refractive anisotropy ($\Delta n$) of the rod-shaped liquid crystalline molecule and the cell gap (d) is within a range of from 300 to 1500 nm. The retardation film to be used in STN-type liquid crystal display devices is described in JP-A-2000-105316.

(VA-Type Liquid crystal Display Device)

The transparent polymer film of the invention is especially advantageously used as the retardation film or as a support of the retardation film in a VA-type liquid crystal display device having a VA-mode liquid crystal cell. The VA-type liquid crystal display device may be a multi-domain system, for example, as in JP-A-10-123576. In these embodiments, the polarizer that comprises the transparent polymer film of the invention contributes to enlarging the viewing angle of the display panel and to improving the contrast thereof.

(IPS-Type Liquid crystal Display Device and ECB-Type Liquid crystal Display Device)

The transparent polymer film of the invention is especially advantageously used as the retardation film, as a support of the retardation film or as a protective film of the polarizer in an IPS-type liquid crystal display device and an ECB-type liquid crystal display device having an IPS-mode or ECB-mode liquid crystal cell. In the devices of these modes, the liquid crystal material is aligned nearly in parallel in black display, or that is, the liquid crystal molecules are aligned in parallel to the substrate face while no voltage is applied thereto, thereby giving black display. In these embodiments, the polarizer that comprises the transparent polymer film of the invention contributes to enlarging the viewing angle of the display panel and to improving the contrast thereof.

(OCB-Type Liquid crystal Display Device and HAN-Type Liquid Crystal Display Device)

The transparent polymer film of the invention is also especially advantageously used as a support of the retardation film in an OCB-type liquid crystal display device having an OCB-mode liquid crystal cell and in a HAN-type liquid crystal display device having a HAN-mode liquid crystal cell. The retardation film to be used in an OCB-type liquid crystal display device and a HAN-type liquid crystal display device is preferably so designed that the direction in which the absolute value of the retardation of the film is the smallest does not exist both in the in-plane direction of the retardation film and in the normal direction thereof. The optical properties of the retardation film to be used in an OCB-type liquid crystal display device and a HAN-type liquid crystal display device may vary depending on the optical properties of the optically anisotropic layer therein, the optical properties of the support therein and the relative positioning of the optically anisotropic layer and the support therein. The retardation film to be used in an OCB-type liquid crystal display device and a HAN-type liquid crystal display device is described in JP-A-9-197397. It is described also in a Mori et al's report (*Jpn. J. Appl. Phys.*, Vol. 38 (1999), p. 2837).

(Reflection-Type Liquid crystal Display Device)

The transparent polymer film of the invention may be advantageously used also as the retardation film in TN-mode, STN-mode, HAN-mode and GH (guest-host)-mode reflection-type liquid crystal display devices. These display modes are well known from the past. TN-mode reflection-type liquid crystal display devices are described in JP-A-10-123478, WO98/48320, and Japanese Patent 3022477. The retardation film for use in reflection-type liquid crystal display devices is described in WO00/65384.

(Other Liquid crystal Display Devices)

The transparent polymer film of the invention may be advantageously used also as a support of the retardation film in an ASM (axially symmetric aligned microcell)-type liquid crystal display device having an ASM-mode liquid crystal cell. The ASM-mode liquid crystal cell is characterized in that the cell thickness is held by a position-adjustable resin spacer. The other properties of the cell are the same as those of the TN-mode liquid crystal cell. The ASM-mode liquid crystal cell and the ASM-type liquid crystal display device are described in a Kume et al's report (Kume et al., SID 98 Digest 1089 (1988)).

(Hard Coat Film, Antiglare Film, Antireflection Film)

As the case may be, the transparent polymer film of the invention may be applied to a hard coat film, an antiglare film and an antireflection film. For the purpose of improving the visibility of flat panel displays such as LCD, PDP, CRT, EL, any or all of a hard coat layer, an antiglare layer and an antireflection layer may be given to one or both surfaces of the transparent polymer film of the invention. Preferred embodiments of such antiglare film and antireflection film are described in detail in Hatsumei Kyokai Disclosure Bulletin (No. 2001-1745, issued Mar. 15, 2001, Hatsumei Kyokai), pp. 54-57, and are preferably employed also for the transparent polymer film of the invention.

EXAMPLES

<<Measuring Method>>

Hereinafter, methods of measuring and evaluating the characteristics used in the following Examples and Comparative Examples will be described.

[X-ray Diffractive Intensity]

Three points (the center portion and end portions (positions away from both end portions by 5% of the whole width)) in the width direction of the film were sampled, the sample of 2 cm☐ was taken, the average value of each point measured in accordance with the above-mentioned method was calculated, and $Ic_2/(Iam_2+Ic_2)$, a half-value width of the peak, $Ic_4/(Iam_4+Ic_4)$ and $Ic_{21}/Ic_{22}$ were calculated.

[Moisture Absorptivity]

Three points (the center portion and end portions (positions away from both end portions by 5% of the whole width)) in the width direction of the film were sampled, and the average value of each point measured in accordance with the above-mentioned method to obtain a moisture absorptivity.

[Haze]

Five points (the center portion, end portions (positions away from both end portions by 5% of the whole width)), and two points of middle portions between the center portion and the end portions) in the width direction of the film were sampled and then the average value of each point measured in accordance with the above-mentioned method was calculated to evaluate the haze value.

[Retardation]

Five points (the center portion, end portions (positions away from both end portions by 5% of the whole width)), and two points of middle portions between the center portion and the end portions) in the width direction of the film were sampled each 100 m in the longitudinal direction, the sample of 5 cm☐ was taken, the average value of each point measured in accordance with the above-mentioned method was calculated to evaluate Re, Rth, and then the direction of the in-plane slow-phase axis.

[Melting Point]

20 mg of a sample was placed in a pan for the Differential Scanning Calorimetry (DSC) measurement and the temperature of the sample was raised from 30° C. to 120° C. at a rate of 10° C./min in a nitrogen stream and kept at the temperature for 15 minutes, followed by cooling to 30° C. at a rate of −20° C./min, Thereafter, the temperature of the sample was raised again from 30° C. to 300° C. and the temperature at the apex of an endothermal peak appeared during the temperature rising was adopted as a melting point of the film.

[Polarization Degree]

Two sheets of the polarizer produced herein were stuck together with their absorption axes kept in parallel to each other and the transmittance (Tp) thereof was measured; and the two sheets were stuck together with their absorption axes kept perpendicular to each other and the transmittance (Tc)

thereof was measured. The polarization degree (P) of the polarizer was calculated in accordance with the following formula:

Polarization Degree $P=((Tp-Tc)/(Tp+Tc))^{0.5}$

Hereinafter, the characteristics of the invention will be more concretely described with reference to the following Examples and Comparative Examples. In the following Examples, materials, the amount and the ratio thereof, details of the treatment, and the treatment process may be suitably modified within the range of not impairing the purpose of the invention. Accordingly, the invention should not be limitatively interpreted by the Examples mentioned below.

Examples 101 to 114, Comparative Examples 101 to 103

(Preparation of Polymer Solution)

1) Cellulose Acylate

In respective Examples 101 to 114 and Comparative Examples 101 to 103, the cellulose acylates A or B described later was used according to Table 1. Each cellulose acylate was heated and dried at 120° C. to have a moisture absorptivity of 0.5% by mass or less. After that, 15 parts by mass of cellulose acylate was used.

Cellulous Acylate A:

Powder of cellulous acetate having a substitution degree of 2.85 was used. In cellulous acylate A, a viscosity-average polymerization degree was 300, a substitution degree of 6-acetyl group was 0.89, a acetone extraction was 7 mass %, a ratio of mass average molecular weight/number average molecular weight was 2.3, a percentage of moisture absorptivity was 0.2 mass %, a viscosity of 6 mass %-dichloromethane solvent was 305 mPa·s, residual acetic acid amount was 0.1 mass % or less, Ca-containing amount was 65 ppm, Mg-containing amount was 26 ppm, Fe-containing amount was 0.8 ppm, sulphuric acid ion-containing amount was 18 ppm, a yellow index was 1.9, and glass acetic acid amount was 47 ppm. An average particle size was 1.5 mm and a standard deviation was 0.5 mm.

Cellulous Acylate B:

Powder of cellulous acetate having a substitution degree of 2.80 was used. In cellulous acylate B, a viscosity-average polymerization degree was 300 and a substitution degree of 6-acetyl group was 0.87.

[Substitution Degree]

The substitution degree of acyl of cellulose acylate was determined by the use of $^{13}$C-NMR according to the method described in *Carbohydr. Res.* 273 (1995), pp. 83 to 91 (by Tezuka, et al).

[Polymerization Degree]

The cellulose acylate produced herein is absolutely dried, then about 0.2 g thereof is accurately weighed, and dissolved in 100 mL of a mixed solvent of dichloromethane:ethanol=9:1 (mass ratio). Using an Ostwald viscometer, the time (second) taken by its dropping at 25° C. is measured, and the polymerization degree DP is calculated according to the following formulae.

$\eta_{rel}T/T_0$ $[\eta]=ln(\eta_{rel})/C$ $DP=[\eta]/Km$ wherein T indicates the time (second) taken by the dropping sample; $T_0$ indicates the time (second) taken by the dropping solvent alone; ln indicates a natural logarithm; C indicates the concentration (g/L); and Km is $6\times10^{-4}$.

2) Solvent

In respective Examples and Comparative Examples, either the following solvent A or B was used according to Table 1. Each solvent had the moisture absorptivity of 0.2% by mass or below.

Solvent A:

A mixed solvent in which dichloromethane/methanol/butanol (83/15/2 parts by mass) are mixed was used.

Solvent B:

A mixed solvent in which dichloromethane/methanol (92/8 parts by mass) are mixed was used.

3) Additive

In respective Examples and Comparative Examples, any one of an additive A to D having the following composition was used according to Table 1.

Additive A:
Triphenyl phosphate (1.2 parts by mass)
Biphenyldiphenyl phosphate (0.6 part by mass)
Silicon dioxide fine particles (particle size: 20 nm, Mohs hardness: about 7) (0.08 part by mass)

Additive B:
Silicon dioxide fine particles (particle size: 20 nm, Mohs hardness: about 7) (0.08 part by mass)

Additive C:
Triphenyl phosphate (2.0 parts by mass)
Biphenyldiphenyl phosphate (1.0 part by mass)
Silicon dioxide fine particles (particle size: 20 nm, Mohs hardness: about 7) (0.08 part by mass)

Additive D:
Triphenyl phosphate (3.0 parts by mass)
Biphenyldiphenyl phosphate (1.5 part by mass)
Silicon dioxide fine particles (particle size: 20 nm, Mohs hardness: about 7) (0.08 part by mass)

4) Dissolution

In respective Examples and Comparative Examples, the dissolution process described later was used according to Table 1.

Dissolution Process:

The solvent and the additive mentioned above were put into a 400-liter stainless dissolution tank, which has stirring blades and is cooled with cooling water that runs around its periphery. With stirring and dispersing them therein, the cellulose acylate was gradually added to the tank. After the addition, this was stirred at room temperature for 2 hours. After thus swollen for 3 hours, this was again stirred to obtain a cellulose acylate solution.

For the stirring, used were a dissolver-type eccentric stirring shaft that runs at a peripheral speed of 15 m/sec (shear stress, $5\times10^4$ kgf/m/sec$^2$ [$4.9\times10^5$ N/m/sec$^2$]) and a stirring shaft that has an anchor blade at the center axis thereof and runs at a peripheral speed of 1 m/sec (shear stress, $1\times10^4$ kgf/m/sec$^2$ [$9.8\times10^4$ N/m/sec$^2$]). For the swelling, the high-speed stirring shaft was stopped and the peripheral speed of the anchor blade-having stirring shaft was reduced to 0.5 m/sec.

The swollen solution in the tank was heated up to 50° C. via a jacketed pipe line, and then further heated up to 90° C. under a pressure of 2 MPa for complete dissolution. The heating time was 15 minutes. In this stage, the filter, the housing and the pipe line that are exposed to high temperature are all made of Hastelloy alloy having good corrosion resistance; and the system is covered with a jacket for circulating a heat carrier therethrough for keeping the system warmed and heated.

Next, this was cooled to 36° C. to obtain a cellulose acylate solution.

5) Filtration

The cellulose acylate solution thus obtained was filtered through a paper filter sheet (#63, manufactured by Toyo Roshi Kaisha, Ltd.) having an absolute filtration accuracy of 10 μm, and then through a sintered metal filter sheet (FH025, manufactured by Pall Corporation) having an absolute filtration accuracy of 2.5 μm to obtain a polymer solution.

(Production of Film)

In respective Examples and Comparative Examples, a film-forming process described later was used according to Table 1.

Film-Forming Process:

The cellulose acylate solution was heated at 30° C., passed through a caster, Giesser (described in JP-A-11-314233), and cast onto a mirror-faced stainless support having a band length of 60 m and the surface temperature of the mirror-faced stainless support was set at 15° C., at a casting speed of 50 m/min. The casting width was 200 cm. The space temperature in the entire casting zone was set at 15° C. At 50 cm before the end point of the casting zone, the cellulose acylate film thus cast and rolled was peeled off from the band and exposed to drying air applied thereto at 45° C. Next, this was dried at 110° C. for 5minutes and then at 140° C. for 10 minutes to obtain a transparent film of cellulose acylate having a thickness of 80 μm.

(Heat Treatment)

In respective Examples and Comparative Examples, the heat treating method used was selected from following heat treating methods A to C and was shown in Table 1.

The elongation of the film was obtained according to the following formula in such a manner that gauge lines were given to the film at a constant interval in the direction perpendicular to the transport direction of the film and the interval was measured before and after the heat treatment.

Elongation of film (%)=100× {(interval of gauge lines after heat treatment)−(interval of gauge lines before heat treatment)}/interval of gauge lines before heat treatment In the Table 1, TAC A indicates commercial cellulose acylate film (FUJITAC TBOUZ; manufactured by Fuji Photo Film Co., Ltd.)

Heat Treatment Process A

A heat treatment was subjected to the obtained film by using a device having a heating zone between two nip rolls. A contraction ratio in the width direction was controlled by adjusting the temperature of the heating zone and the circumferential velocity of the nip rolls. A longitudinal/transverse ratio (distance between nip rolls/base width) was adjusted to be 3.3, the base temperature before the film enters the heating zone was set to 25° C., and the film was heated in the heating zone at the temperature described in Table 1 for one minute.

Heat Treatment Process B

While the obtained film was gripped by tenter clips, the film was subjected to the heat treatment by using a device which allows the film to pass through the heating zone. A contraction ratio in the width direction was controlled by adjusting a width of a rail. The base temperature before the film enters the heating zone was set to 25° C. and the film was heated in the heating zone at the temperature described in Table 1 for one minute.

(Evaluation of Transparent Polymer Film)

The respective transparent polymer films obtained in Examples and Comparative Examples were evaluated. The results are shown in Table 1 below.

The variation (variation of values measured at five portions) of Re and Rth evaluated based on the above-mentioned method was at most ±0.5 nm and at most ±1 nm, respectively, for the samples of the Examples. The fluctuation range in the direction of the slow-phase axis was below 0.5°.

TABLE 1

| | Cellulose Acylate Type | Solvent | Additive | (285 × S + 970) | (285 × S + 1000) | Heat Treatment Process | Heat Treatment Temperature [° C.] | Contraction Ratio [%] | Film Extension [%] |
|---|---|---|---|---|---|---|---|---|---|
| Example 101 | A | A | A | 158 | 188 | A | 180 | 35 | 60 |
| Example 102 | A | A | A | 158 | 188 | A | 185 | 40 | 70 |
| Example 103 | A | B | A | 158 | 188 | A | 180 | 30 | 45 |
| Example 104 | A | A | B | 158 | 188 | A | 160 | 10 | 20 |
| Example 105 | A | A | B | 158 | 188 | A | 170 | 20 | 35 |
| Example 106 | A | A | B | 158 | 188 | B | 170 | 8 | 3 |
| Example 107 | A | A | B | 158 | 168 | B | 170 | 0.5 | 3 |
| Example 108 | A | A | C | 158 | 188 | A | 165 | 38 | 60 |
| Example 109 | B | A | B | 172 | 202 | A | 180 | 23 | 30 |
| Example 110 | B | A | B | 172 | 202 | A | 180 | 20 | 44 |
| Example 111 | B | A | B | 172 | 202 | A | 200 | 35 | 74 |
| Comparative Example 101 | A | A | A | 158 | 188 | A | 200 | 14 | 10 |
| Comparative Example 102 | A | A | B | 158 | 188 | B | 180 | −10 | 2 |
| Comparative Example 103 | (TAC A) | — | — | 158 | 188 | None | — | — | — |
| Example 112 | (TAC A) | — | — | 158 | 188 | A | 185 | 33 | 73 |
| Example 113 | A | A | C | 158 | 188 | B | 185 | 0 | 0 |
| Example 114 | (TAC A) | — | — | 158 | 188 | B | 185 | 0 | 0 |

TABLE 1-continued

| | X-ray Diffractive Intensty | | | | Moisture | | | |
|---|---|---|---|---|---|---|---|---|
| | $Ic_2/(Iam_2 + Ic_2)$ | Half Value Width [°] | $Ic_4/(Iam_4 + Ic_4)$ | $Ic_{21}/IC_{22}$ | Absorption Ratio [%] | Haze [%] | Re Average [nm] | Rth Average [nm] |
| Example 101 | 0.43 | 3.3 | 0.10 | 104 | 2.6 | 0.3 | 3 | 4 |
| Example 102 | 0.51 | 3.5 | 0.12 | 104 | 2.5 | 0.3 | 2 | 3 |
| Example 103 | 0.43 | 3.3 | 0.09 | 104 | 2.6 | 0.3 | 1 | 2 |
| Example 104 | 0.40 | 4.4 | 0 | 68 | 3.0 | 0.2 | 3 | 5 |
| Example 105 | 0.41 | 4.1 | 0.04 | 86 | 2.7 | 0.2 | 1 | −1 |
| Example 106 | 0.41 | 4.2 | 0 | 85 | 2.8 | 0.2 | 0 | 0 |
| Example 107 | 0.40 | 4.3 | 0 | 80 | 2.8 | 0.2 | 2 | 1 |
| Example 108 | 0.47 | 3.4 | 0.11 | 109 | 1.7 | 0.2 | 3 | 3 |
| Example 109 | 0.41 | 4.2 | 0 | 81 | 2.9 | 0.2 | 1 | 2 |
| Example 110 | 0.41 | 4.2 | 0 | 101 | 2.9 | 0.3 | 1 | 2 |
| Example 111 | 0.52 | 3.4 | 0.11 | 126 | 2.8 | 0.2 | 3 | 8 |
| Comparative Example 101 | 0.53 | 2.8 | 0.22 | 122 | 3.2 | 0.2 | 32 | −31 |
| Comparative Example 102 | 0.37 | 5.0 | 0.05 | 34 | 2.8 | 0.5 | 6 | 7 |
| Comparative Example 103 | 0.38 | 4.6 | 0 | 42 | 3.1 | 0.3 | 1 | 48 |
| Example 112 | 0.51 | 3.5 | 0.11 | 99 | 2.8 | 0.5 | 1 | 4 |
| Example 113 | 0.44 | 4.0 | 0.10 | 41 | 2.5 | 0.2 | 0 | 0 |
| Example 114 | 0.44 | 4.0 | 0.10 | 40 | 2.5 | 0.2 | 1 | 2 |

As shown in Table 1, by performing the heat treatment in accordance with the method of the invention, it is possible to manufacture a cellulous acylate film having a preferable X-ray diffractive intensity, having the low haze, improving both of an optical property and a moisture absorptivity. However, when the condition of the heat treatment does not fall within the range of the invention, it is difficult to manufacture the cellulous acylate film having a preferable X-ray diffractive intensity and the direction of the slow-phase axis is not preferable.

The samples of Examples 113 and 114 which were not drawn in the heat treatment show no humidity dependency of Re (delta Re=|Re(10%)−Re(80%)|=0) and a low humidity dependency of Rth (delta Rth=|Rth(10%)−Rt(80%)|) of 19 nm and 27 nm, respectively.

Comparative Example 104

Except that the additive A in Example 102 was changed to the additive D, Comparative Example 104 was carried out in the same manner as Example 102. However the obtained film can not serve as an optical film because of bleed-out of the additive at the time of the heating process.

Example 151 to 154

(Re-extension of Film)

Both ends of the cellulous acylate film completing the heat treatment were gripped tenter clips and then the film was extended in the heating zone. The temperature of the heating zone, the extension ratio and evaluation of the obtained cellulous acylate film was shown in Table 2. The extension ratio was obtained by drawing gauge lines at regular intervals in a direction parallel to the transport direction of the film and then measuring the gauge lines before and after the extension.

Extension Ratio(%)=100× (interval of gauge line after extension−interval of gauge line before extension)/(interval of gauge line before extension)

TABLE 2

| | | Extension | | X-ray Diffractive Intensity | | | | | | | | Slow-Phase Axis Angle | |
|---|---|---|---|---|---|---|---|---|---|---|---|---|---|
| | | | | | | | $2\theta_2$ | | $2\theta_4$ | | | | | |
| | Heat Treated Film | Temperature [° C.] | Ratio [%] | Ic/(Iam + Ic) | Half Value Width [°] | $Ic_2/IC_2$ | Position [°] | Half Value Width [°] | Haze [%] | Re Average [nm] | Rth Average [nm] | Sound Velocity [°] | Transport Direction [°] |
| Example 151 | Example 108 | 160 | 30 | 0.66 | 0.6 | 223 | 10.3 | 0.8 | 0.2 | 210 | −18 | 90 | 90 |
| Example 152 | Example 108 | 160 | 34 | 0.65 | 0.9 | 204 | 10.2 | 0.8 | 0.2 | 200 | −1 | 90 | 90 |
| Example 153 | Example 108 | 200 | 30 | 0.68 | 0.7 | 241 | 10.3 | 0.7 | 0.2 | 225 | −20 | 90 | 90 |
| Example 154 | Example 109 | 200 | 20 | 0.42 | 1.8 | 127 | 10.5 | 1.5 | 0.2 | 158 | 50 | 90 | 90 |

Example 201

(Production of Retardation Film)

Using the cellulose acylate film obtained in Example 152, a retardation film sample was prepared in accordance with a method described in Example 1 of JP-A-2003-315541.

Specifically, polyimide synthesized from 2,2'-bis(3,4-dicarboxy diphenyl)hexafluoropropane dianhydride (6FDA) and 2,2'-bis(trifluoromethyl)-4,4'-diamino biphenyl (TFMB) (average molecular weight (Mw) was 70000, Δn was about 0.04) was dissolved in cyclohexanon (solvent), and then a solution prepared in 25% by mass was applied to the cellulose acylate film obtained in Example 152. The film was heated at a temperature of 100° C. for 10 minutes, and then longitudinally-uniaxially drawn at an extension ratio of 15% and at a temperature of 130° C. As a result, a retardation film in which a polyimide layer having a film thickness of 5.7 μm is formed on the cellulose acylate film obtained in Example 152 was obtained. The optical characteristic of the retardation film was Re=70 nm and Rth=220 nm, and the retardation film had a birefringent layer of nx>ny>nz at orientation-axis-misalignment angle within ±0.30.

Comparative Example 201

(Production of Retardation Film)

Except that the cellulose acylate film obtained in Example 152 was changed to the cellulose acylate film obtained in Comparative Example 103, Comparative Example 201 was carried out in the same manner as Example 201, and then the retardation film was obtained. The optical characteristic of the retardation film was Re=70 nm and Rth=260 nm, and the retardation film had a birefringent layer of nx>ny>nz at orientation-axis-misalignment angle within ±0.3°.

Examples 301 to 320, Comparative Examples 301 to 310

(Manufacture of Polarizer)

The obtained film was subjected to saponification treatment, thereby manufacturing a polarizer.

1) Saponification of Film

A film A and film B shown in Table 3 below were dipped in a 1.5 mol/L of NaOH aqueous solution (saponification solution) that was temperature-controlled at 55° C. for 2 minutes and then washed with water. After that, the films were dipped in a 0.05 mol/L sulfuric acid aqueous solution for 30 seconds and further passed through a water washing bath. Then, the films were subjected to air knife treatment three times to remove water and retained in a drying zone at 70° C. for 15 seconds to be dried, thereby manufacturing saponified films.

2) Manufacture of Polarizing Layer

According to Example 1 described in JP-A-2001-141926, the film was stretched in a longitudinal direction by giving difference in circumferential velocities to two pairs of nip rolls, thereby preparing a polarizing layer having a thickness of 20 μm.

3) Sticking

The polarizing layer thus obtained and the two films (film A and film B respectively, whose combination in respective Examples and Comparative Examples is shown in Table 3 below) selected from the saponified films were disposed so that the saponified surfaces of the film faced to the polarizing film and sandwiched the polarizing layer, and then stuck to each other by the use of a 3% PVA (PVA-117H, manufactured by KURARAY Co., Ltd.) aqueous solution as an adhesive in such a manner that the polarizing axis crossed perpendicularly to the longitudinal direction of the film using roll-to-roll process.

In Table 3, 'TAC B' indicates FUJITAC TD80UF (manufactured by Fujifilm corporation; moisture permeability =430 g/(m$^2$·day) at 40° C. and a relative humidity of 90%) (80 μm in terms of thickness), 'polycarbonate' indicates Panlite C1400 (manufactured by TEIJIN CHEMICALS, Ltd.; moisture permeability=30 g/(m$^2$·day) at 40° C. and a relative humidity of 90%) (80 μm in terms of thickness), 'COP1' indicates ARTON FILM (thickness: 80 μm, manufactured by JSR corporation; moisture permeability=30 g/(m$^2$·day) at 40° C. and a relative humidity of 90%) (80 μm in terms of thickness), and 'COP2' indicates ZEONOR FILM (thickness: 100 μm, manufactured by ZEON; moisture permeability=0 g/(m$^2$·day) at 40"C and a relative humidity of 90%) (80 μm in terms of thickness).

In Comparative Example 304, the sticking was carried out by using a film which had been subjected to surface treatment replaced by corona treatment.

In Example 320 and Comparative Example 310, the sticking was not carried out as one side of the film surface sticking to the retardation film was opposite side of the surface polyimide did not painted and that the slow axis direction of the retardation film crossed perpendicularly to the absorption axis direction of the polarizer.

(Evaluation of Polarizer)

[Initial Polarization Degree]

The polarization degree of the polarizer was calculated according to the method described above. The result is shown in Table 3.

[After Storage Polarization Degree 1]

The film A side of the polarizer was stuck to a glass plate with an adhesive, and was left under conditions of 60° C. and a relative humidity of 95% for 500 hours and the polarization degree after the lapse of time (after storage polarization degree) was calculated according to the aforementioned method. The results are shown in Table 3 below.

[After Storage Polarization Degree 2]

The film A side of the polarizer was stuck to a glass plate with an adhesive, and was left under conditions of 90° C. and a relative humidity of 0% for 500 hours and the polarization degree after the lapse of time (after storage polarization degree) was calculated according to the aforementioned method. The results are shown in Table 3 below.

TABLE 3

| | Film A | Film B | Initial Polarization Degree [%] | After Storage Polarization Degree 1 [%] | After Storage Polarization Degree 2 [%] |
|---|---|---|---|---|---|
| Example 301 | Example 101 | TAC B | 99.9 | 99.9 | 99.9 |
| Example 302 | Example 102 | TAC B | 99.9 | 99.9 | 99.9 |
| Example 303 | Example 103 | TAC B | 99.9 | 99.9 | 99.9 |
| Example 304 | Example 104 | TAC B | 99.9 | 99.9 | 99.9 |

TABLE 3-continued

|  | Film A | Film B | Initial Polarization Degree [%] | After Storage Polarization Degree 1 [%] | After Storage Polarization Degree 2 [%] |
|---|---|---|---|---|---|
| Example 305 | Example 105 | TAC B | 99.9 | 99.9 | 99.9 |
| Example 306 | Example 106 | TAC B | 99.9 | 99.9 | 99.9 |
| Example 307 | Example 107 | TAC B | 99.9 | 99.9 | 99.9 |
| Example 308 | Example 108 | TAC B | 99.9 | 99.9 | 99.9 |
| Example 309 | Example 109 | TAC B | 99.9 | 99.9 | 99.9 |
| Example 310 | Example 110 | TAC B | 99.9 | 99.9 | 99.9 |
| Example 311 | Example 111 | TAC B | 99.9 | 99.9 | 99.9 |
| Example 312 | Example 112 | TAC B | 99.9 | 99.9 | 99.9 |
| Example 313 | Example 113 | TAC B | 99.9 | 99.9 | 99.9 |
| Example 314 | Example 114 | TAC B | 99.9 | 99.9 | 99.9 |
| Example 315 | Example 151 | TAC B | 99.9 | 99.9 | 99.9 |
| Example 316 | Example 152 | TAC B | 99.9 | 99.9 | 99.9 |
| Example 317 | Example 153 | TAC B | 99.9 | 99.9 | 99.9 |
| Example 318 | Example 154 | TAC B | 99.9 | 99.9 | 99.9 |
| Example 319 | Example 153 | Example 153 | 99.9 | 99.9 | 99.9 |
| Example 320 | Example 201 | TAC B | 99.9 | 99.9 | 99.9 |
| Comparative Example 301 | Polycarbonate | Polycarbonate | (Unmeasurable due to insufficient sticking property) | | |
| Comparative Example 302 | COP1 | COP1 | (Unmeasurable due to insufficient sticking property) | | |
| Comparative Example 303 | COP2 | COP2 | (Unmeasurable due to insufficient sticking property) | | |
| Comparative Example 304 | COP2 | COP2 | 99.9 | 99.9 | (Bubble generation) |
| Comparative Example 305 | Comparative Example 101 | TAC B | 99.9 | 99.9 | 99.9 |
| Comparative Example 306 | Comparative Example 102 | TAC B | 99.9 | 99.9 | 99.9 |
| Comparative Example 307 | Comparative Example 103 | TAC B | 99.9 | 99.9 | 99.9 |
| Comparative Example 308 | TAC B | TAC B | 99.9 | 99.9 | 99.9 |
| Comparative Example 309 | Comparative Example 201 | TAC B | 99.9 | 99.9 | 99.9 |

Examples 401 to 420

(Mounting Evaluation onto Liquid Crystal Display Device)

The cellulose acylate film, the retardation film, and the polarizing plate in Examples were mounted on the Liquid crystal display device and a confirmation test was carried out to confirm whether the optical property is sufficient. IPS type, VA type and OCB type liquid crystal cells were used in the Examples, but the use of the cellulose acylate film, the retardation film and the polarizing plate according to the invention is not limited to the operation mode of the liquid crystal display device.

(Mounting Evaluation 1 onto IPS type Liquid Crystal Display Device)

Using an ARTON FILM (manufactured by JSR corporation), a retardation film in which Re was 270 nm and Rth was 0 nm was produced in accordance with a method disclosed in JP-A-05-157911. The retardation film was attached to the polarizing plates obtained in Examples 301 to 320 such that the in-plane slow-phase axis direction of the retardation film was perpendicular to the transmission axis of the polarizing plate. Then, a laminated plate having an optical compensation property was produced and used in Examples 401 to 420.

In respective Examples 401 to 420, two pairs of laminated plates were produced, and a liquid crystal display device was produced by laminating the laminated plates and the IPS type liquid crystal cell in this order "the laminated plate of Examples 401 to 420/the IPS type liquid crystal cell/the laminated plate of Examples 401 to 420" such that the retardation films became the liquid crystal cell. At this time, the transmission axes of the upper and lower polarizing plates were perpendicular to each other, and the transmission axis of the upper polarizing plate was parallel to the direction of the longitudinal axis of the molecule of the liquid crystal cell (that is, the slow-phase axis direction of the optical compensation layer was perpendicular to the direction of the longitudinal axis of the molecule of the liquid crystal cell.). The liquid crystal cell, the electrodes and the substrate used in Examples were IPS type and were used without modification. The orientation of the liquid crystal cell was a parallel orientation and the liquid crystal had positive dielectric constant anisotropy so that a commercially available product for IPS liquid crystal was used. The properties of the liquid crystal cell were $\Delta n$: 0.099, cell gap of liquid crystal layer: 3.0 μm, pretilt angle: 5°, and rubbing direction: 75° in upper and lower sides of the substrate.

A light leakage ratio of the liquid crystal display device produced as described above at the time of displaying black in an azimuth direction of 45° and in a polar angle direction of 70°, from the front side of the device, was measured, and the measurement result was 0.10% or less. Accordingly, it was found that the visual field angle characteristic was excellent and the wavelength dispersion of the retardation was small, and as a result, it was found that the display color was excellent.

An evaluation using the polarizing plates in Comparative Examples 304 to 309 was carried out in the same manner as the above-described evaluation. Since the light leakage ratio was about 0.5% in all of the Liquid crystal display devices, the visual field angle characteristic was founded to be deteriorated.

The liquid crystal displays having the polarizing plates of Examples 313 and 314 were placed in an atmosphere under humidity varying from 10% to 80% for visibility evaluation in accordance with the above method. Visibility change was not observed because the polarizing plates show a low humidity dependency.

The liquid crystal displays having the polarizing plates of Comparative Examples 307 and 308 were evaluated in the same manner. Visibility change was observed depending on the humidity change.

(Mounting Evaluation 2 onto IFS type Liquid Crystal Display Device)

Electrodes were disposed on a glass substrate such that the distance between the electrodes adjacent to each other became 20 μm. Then, a polyimide film as an orientation film was provided thereon, and a rubbing process was performed. A polyimide film was provided on one side of another glass substrate. Then, the rubbing process was performed to form an orientation film. The orientation films of the two glass substrate were disposed to face each other such that the gap between the substrates was 3.9 μm. The glass substrates were attached to each other such that the rubbing directions of the two glass substrates were parallel to each other. Subsequently, a nematic liquid crystal composition in which the refractive index anisotropy ($\Delta n$) was 0.0769 and the dielectric constant anisotropy ($\Delta \epsilon$) was positive 4.5 was enclosed. $d \cdot \Delta n$ of the liquid crystal layer was 300 nm.

The polarizing plate of Example 317 was attached to one side of this IPS mode liquid crystal cell such that the absorption axis of the polarizing plate of Example 317 was parallel to the rubbing direction of the liquid crystal cell and the film A side became the liquid crystal cell. Subsequently, to another side of the liquid crystal cell, the polarizing plate of Comparative Example 308 was attached in the cross-Nicole arrangement. A liquid crystal display device was produced such that a back light was arranged on the polarizing plate side of Example 317.

As described above, the mounting evaluation was performed using the polarizing plate of Comparative Example 308 instead of the polarizing plate of Example 317, and the black color of the liquid crystal display device was evaluated by the change in a total azimuth direction ($\Delta uv$) at a polar angle of 60°. When using the polarizing plate of Example 317, $\Delta uv$ was 0.05 or less, thus the change in color was not substantially felt. However, when using two polarizing plates of Comparative Example 308, $\Delta uv$ was greater than 0.05, thus the change in color was surely recognized. It was found that the change in color was improved by using the cellulose acylate film and the polarizing plate according to the invention, in which Re and Rth were small and the wavelength dependency was also small.

(Mounting Evaluation onto VA type and OCB type Liquid Crystal Display Devices)

Using the films of Examples 101 to 114, the evaluation was performed to the liquid crystal display device described in Example 1 of JP-A-10-48420, the optically anisotropic film including a discotic liquid crystal molecule and the orientation film on which a polyvinyl alcohol is applied described in Example 1 of JP-A-9-26572, the VA type liquid crystal display device described in FIGS. 2 to 9 of JP-A-2000-154261, and the OCB type liquid crystal display device described in FIGS. 10 to 15 of JP-A-2000-154261. The contrast visual field angle characteristic was excellent in any cases.

(Mounting Evaluation onto VA type Liquid Crystal Display Device)

The retardation film of Example 320 was attached to the VA type liquid crystal display device by an adhesive such that the retardation film became the liquid crystal cell. On the opposite side of the liquid crystal cell, the polarizing plate of Comparative Example 308 was attached to the VA liquid crystal panel of Comparative Example 308 by the adhesive such that the absorption axes of the polarizing plates were perpendicular to each other. The visual field angle characteristic of the liquid crystal display device obtained as described above was measured and the measurement result was excellent.

When the mounting evaluation was performed using the retardation film of Comparative Example 320 instead of the retardation film of Example 320, the visual field angle in right, left, up and down was deteriorated, and the cellulose acylate film, the retardation film, and the polarizing plate according to the invention was excellent as the retardation film for the VA type.

INDUSTRIAL APPLICABILITY OF THE INVENTION

According to the invention, it is possible to provide a cellulous acylate film in which both of the optical property and the moisture absorptivity are improved. In addition, it is possible to provide a cellulous acylate film satisfying the above-mentioned condition, lower retardation of the film, and being useful as a retardation film. Since the cellulose acylate film has proper moisture permeability, the film can be adhered to the polarizing film on line. Accordingly, the polarizing plate having excellent visibility and high productivity can be provided. In addition, the liquid crystal display having high-reliability can be provided. Consequently, the invention has high applicability.

While the present invention has been described in detail and with reference to specific embodiments thereof, it will be apparent to one skilled in the art that various changes and modifications can be made therein without departing from the spirit and scope thereof.

The present disclosure relates to the subject matter contained in Japanese Patent Application No. 139565/2006 filed on May 18, 2006, which is expressly incorporated herein by reference in its entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A Cellulose acylate film, in which X-ray diffraction intensity satisfies Formulae (I) to (III) below and a half-value width of the peak at $2\theta_2$ is greater than 3° and not greater than 7°;

$$0.40 \leq Ic_2/(Iam_2 + Ic_2) \leq 0.75; \quad \text{Formula (I)}$$

$$Iam_2 = I_1 + \{(I_3 - I_1)/(2\theta_3 - 2\theta_1) \times (2\theta_2 - 2\theta_1)\}; \quad \text{Formula (II)}$$

and $$Ic_2 = I_2 - Iam_2, \quad \text{Formula (III)}$$

wherein when it is assumed that $\theta$ is the Bragg angle, $2\theta_1$ indicates $2\theta$ at which the intensity becomes the minimum in the $2\theta$ range of 4° to 5°, $2\theta_2$ indicates $2\theta$ at which the intensity becomes the maximum in the $2\theta$ range of 5° to 10°, $2\theta_3$ indicates $2\theta$ at which the intensity becomes the minimum in the $2\theta$ range of 14° to 16°, $I_1$ indicates a diffractive intensity at $2\theta_1$, $I_2$ indicates a diffractive intensity at $2\theta_2$, and $I_3$ indicates a diffractive intensity at $2\theta_3$; and wherein the substitution degree of acyl of the cellulose acylate is 2.70 to 2.98.

2. The cellulose acylate film according to claim 1, in which the X-ray diffraction intensity satisfies following Formulae (IV) to (VI):

$$Ic_4/(Iam_4 + Ic_4) \leq 0.20; \quad \text{Formula (IV)}$$

$$Iam_4 = I_1 + \{(I_3 - I_1)/(2\theta_3 - 2\theta_1) \times (2\theta_4 - 2\theta_1)\}; \quad \text{Formula (V)}$$

and $$Ic_4 = I_4 - Iam_4, \quad \text{Formula (VI)}$$

wherein when it is assumed that $\theta$ is the Bragg angle, $2\theta_1$ indicates $2\theta$ at which the intensity becomes the minimum in the $2\theta$ range of 4° to 5°, $2\theta_3$ indicates $2\theta$ at which the intensity becomes the minimum in the $2\theta$ range of 14° to 16°, $2\theta_4$ indicates $2\theta$ at the maximum of a peak in the $2\theta$ range of 12.5° to 14°, $I_1$ indicates a diffractive intensity at $2\theta_1$, $I_3$ indicates a diffractive intensity at $2\theta_3$, and $I_4$ indicates a diffractive intensity at $2\theta_4$.

3. The cellulose acylate film according to claim 1, wherein the moisture absorptivity at a relative humidity of 80% is 3.0% or less.

4. The cellulose acylate film according to claim 1, wherein the haze is 2% or less.

5. A polarizing plate comprising at least one sheet of the cellulose acylate film according to claim 1.

6. The polarizing plate according to claim 5, wherein the cellulose acylate film is directly attached to the polarizing plate.

7. A liquid crystal display device comprising at least one sheet of the cellulose acylate film according to claim 1.

* * * * *